(12) United States Patent
Toyao et al.

(10) Patent No.: US 10,784,589 B2
(45) Date of Patent: Sep. 22, 2020

(54) WIRELESS COMMUNICATION DEVICE

(71) Applicant: NEC Corporation, Minato-ku, Tokyo (JP)

(72) Inventors: Hiroshi Toyao, Tokyo (JP); Keishi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/776,887

(22) PCT Filed: Nov. 17, 2016

(86) PCT No.: PCT/JP2016/084069
§ 371 (c)(1),
(2) Date: May 17, 2018

(87) PCT Pub. No.: WO2017/086377
PCT Pub. Date: May 26, 2017

(65) Prior Publication Data
US 2018/0358710 A1    Dec. 13, 2018

(30) Foreign Application Priority Data

Nov. 19, 2015 (JP) .................................. 2015-226746
Aug. 24, 2016 (JP) .................................. 2016-163270

(51) Int. Cl.
*H01Q 5/00* (2015.01)
*H01Q 21/06* (2006.01)
(Continued)

(52) U.S. Cl.
CPC ............. *H01Q 21/065* (2013.01); *H01P 1/30* (2013.01); *H01Q 1/42* (2013.01); *H01Q 13/10* (2013.01);
(Continued)

(58) Field of Classification Search
None
See application file for complete search history.

(56) References Cited

U.S. PATENT DOCUMENTS 5,710,569 A * 1/1998 Oh ........................... H01Q 3/20
343/816
5,952,983 A * 9/1999 Dearnley ............... H01Q 1/246
343/797
(Continued)

FOREIGN PATENT DOCUMENTS

JP    2006-025027 A    1/2006
JP    2006/129373 A    5/2006
(Continued)

OTHER PUBLICATIONS

International Search Report for PCT Application No. PCT/JP2016/084069, dated Dec. 20, 2016.
(Continued)

*Primary Examiner* — Trinh V Dinh

(57) ABSTRACT

A wireless communication device includes: a reflector plate that comprises a reflective surface, the reflective surface reflecting an electromagnetic wave; an array antenna that comprises a plurality of antenna elements, the antenna elements being arranged on the reflective surface; one or more fins that stand on the reflective surface; and a transmission and reception circuit that is connected to the reflector plate, and transmits and receives a wireless signal via the array antenna.

9 Claims, 19 Drawing Sheets

(51) Int. Cl.
*H01Q 1/42* (2006.01)
*H01Q 13/10* (2006.01)
*H01P 1/30* (2006.01)
*H01Q 15/00* (2006.01)
*H01Q 15/14* (2006.01)
*H04B 1/38* (2015.01)
*H01Q 21/24* (2006.01)

(52) U.S. Cl.
CPC ....... *H01Q 15/0013* (2013.01); *H01Q 15/148* (2013.01); *H01Q 21/062* (2013.01); *H01Q 21/24* (2013.01); *H04B 1/38* (2013.01)

(56) References Cited

U.S. PATENT DOCUMENTS

| | | | | |
|---|---|---|---|---|
| 5,999,145 | A * | 12/1999 | Niekamp | H01Q 1/1242 343/800 |
| 6,195,063 | B1 * | 2/2001 | Gabriel | H01Q 1/523 343/700 MS |
| 6,295,028 | B1 * | 9/2001 | Jonsson | H01Q 1/246 343/700 MS |
| 9,768,499 | B1 * | 9/2017 | Clark | H01Q 1/523 |
| 2004/0201543 | A1 * | 10/2004 | Gottl | H01Q 1/1207 343/912 |
| 2007/0146225 | A1 * | 6/2007 | Boss | H01Q 21/08 343/797 |
| 2008/0074338 | A1 * | 3/2008 | Vacanti | H01Q 1/28 343/771 |
| 2009/0058752 | A1 | 3/2009 | Lee et al. | |
| 2013/0222201 | A1 * | 8/2013 | Ma | H01Q 1/02 343/834 |
| 2016/0172765 | A1 * | 6/2016 | Motta-Cruz | H01Q 1/1271 343/834 |
| 2016/0190702 | A1 * | 6/2016 | Rucker | H01Q 19/106 343/767 |
| 2017/0125885 | A1 | 5/2017 | Kosaka et al. | |
| 2019/0036225 | A1 * | 1/2019 | Kosaka | H01Q 7/00 |
| 2020/0021005 | A1 * | 1/2020 | Kosaka | H01P 1/30 |

FOREIGN PATENT DOCUMENTS

| | | |
|---|---|---|
| JP | 2009-055613 A | 3/2009 |
| JP | 2014-082701 A | 5/2014 |
| JP | 2015-053660 A | 3/2015 |
| JP | 2015-076853 A | 4/2015 |
| WO | 2015/151139 A1 | 10/2015 |

OTHER PUBLICATIONS

Japanese Office Action for JP Application No. 2017-551919 dated Apr. 9, 2019 with English Translation.

* cited by examiner

WIRELESS COMMUNICATION DEVICE

This application is a National Stage Entry of PCT/JP2016/084069 filed on Nov. 17, 2016, which claims priority from Japanese Patent Application 2015-226746 filed on Nov. 19, 2015 and Japanese Patent Application 2016-163270 filed on Aug. 24, 2016, the contents of all of which are incorporated herein by reference, in their entirety.

TECHNICAL FIELD

The present invention relates to a wireless communication device.

BACKGROUND ART

In order to cope with the rapid increase in the amount of wireless communication in recent years, a MIMO communication method (multiple-input and multiple-output communication method) that uses a plurality of antennas at the same time, and beamforming by means of an array antenna having a plurality of antenna elements arranged at intervals are being increasingly used. In addition, the number of antennas mounted in wireless communication devices including mobile base stations as well as communication circuits and baseband circuits connected to the antennas also tend to increase. As the number of these circuits increases, the amount of heat generated by the wireless communication devices increases, leading to an increase in the size of the radiator and the heat exchanger for cooling.

As a technique for promoting heat dissipation of the wireless communication device as described above, there is known a device disclosed in Patent Document 1 below. Patent Document 1 discloses a wireless communication device that is reduced in size by integrating a heat radiator and a reflector plate of an antenna to improve heat dissipation performance per volume. In this wireless communication device, a metal reflector plate occupying a relatively large area is utilized as a heat dissipation path, and heat dissipation fins are provided on the back surface side of the reflector plate to reduce thermal resistance. Accordingly, it is said that it is possible to improve heat dissipation performance without increasing the volume of the device.

PRIOR ART DOCUMENTS

Patent Documents

[Patent Document 1] U.S. Patent Application Publication No. 2013/0222201

DISCLOSURE OF THE INVENTION

Problem to be Solved by the Invention

However, in the wireless communication device disclosed in Patent Document 1 mentioned above, heat dissipation is performed mainly by heat dissipation fins provided on a back surface side of the reflector plate. For this reason, when mounted on a wall surface or a pillar, the majority of the heat dissipation fins are covered by the wall surface and the pillar, and the amount of air that comes in contact with the heat dissipation fins cannot be ensured. As a result, there is a possibility that the heat dissipation performance may become limited.

The present invention has been made to solve the above problem, and provides a wireless communication device capable of improving heat dissipation performance while suppressing an increase in size of the device.

Means for Solving the Problem

A wireless communication device according to one exemplary aspect of the present invention includes: a reflector plate having a reflective surface that reflects electromagnetic waves; an array antenna having a plurality of antenna elements arranged at intervals on the reflective surface; heat dissipation fins that stand on the reflective surface; and a communication circuit that excites the array antenna and transmits and/or receives wireless signals via the array antenna.

Effect of the Invention

According to the present invention, it is possible to provide a wireless communication device capable of improving heat dissipation performance while suppressing an increase in size of the device.

EMBODIMENTS FOR CARRYING OUT THE INVENTION

First Exemplary Embodiment

A wireless communication device 100 according to a first exemplary embodiment of the present invention is described, with reference to the drawings.

Figure 1:
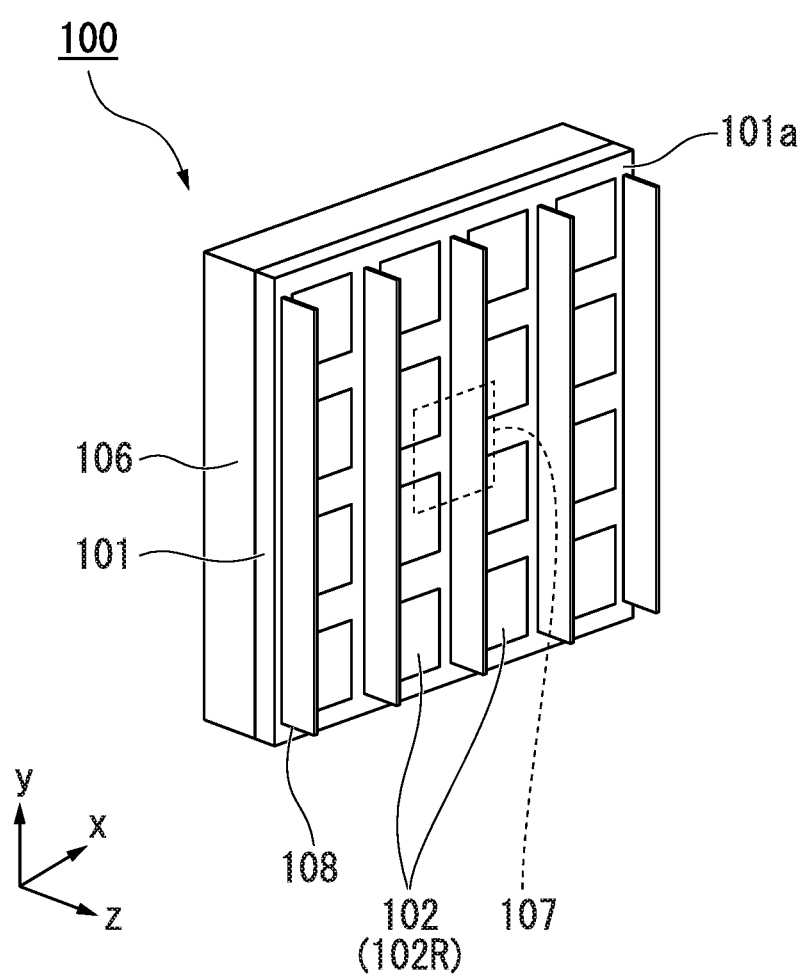
FIG. 1 is a diagram showing a wireless communication device according to a first exemplary embodiment of the present invention.

As shown in FIG. 1, the wireless communication device 100 according to the present exemplary embodiment includes: a box-shaped casing part 106; a reflector plate 101 integrally attached to the casing part 106; an array antenna 102R having a plurality of antenna elements 102 provided on the reflector plate 101; one or more heat dissipation fins 108 that stand on the reflector plate 101 (that is to say, connected substantially perpendicularly to the reflector plate 101); and a communication circuit 107 built into the casing part 106.

The communication circuit 107 is electrically connected to the array antenna 102R. As a result, a radio signal generated by the communication circuit 107 is radiated into the atmosphere as an electromagnetic wave via the array antenna 102R, and is transmitted to and/or received from another device (such as a wireless terminal).

The communication circuit 107 is connected to the reflector plate 101 by a member having high thermal conductivity, and a part of generated heat is conducted to the reflector plate 101. As a member having high thermal conductivity, a ball grid array (BGA), a solder ball, a solder ball with a periphery filled with a thermally conductive underfill, or the like may be used.

The reflector plate 101 is a plate-shaped member formed of an electrically conductive material. A surface on one side of the reflector plate 101 is a reflective surface 101a that reflects electromagnetic waves. The reflector plate 101 is attached so that the reflective surface 101a is a surface opposite to the surface that is in contact with the casing part 106. In the following description, directions orthogonal to each other in a plane in which the reflective surface 101a extends, are defined as an x-axis direction and a y-axis direction, respectively, and the normal direction of the xy plane formed by the x-axis and the y-axis is defined as a z-axis direction. Hereunder, the y-axis positive direction side is defined as perpendicularly upwards and the y-axis negative direction is defined as perpendicularly downwards.

On the reflective surface 101a, the plurality of antenna elements 102 are arranged with a space therebetween to form the antenna array 102R. In the present exemplary embodiment, the plurality of antenna elements 102 are arranged in a lattice pattern when viewed from the normal direction (the z-axis direction) of the reflective surface 101a. By changing the phase and electric power of signals for each of the antenna elements 102 constituting the antenna array 102R, beamforming in which radio waves can be intensively emitted in a specific direction becomes possible.

In the present exemplary embodiment, each of the antenna elements 102 is a planar patch antenna extending in a plane parallel to the reflective surface 101a. A known type may be used as the patch antenna. For example, by providing a feeding point passing through the reflector plate 101, the patch antenna and the communication circuit 107 can be connected via the feeding point.

Between the plurality of antenna elements 102 there are formed the heat dissipation fins 108. In FIG. 1, the heat dissipation fins 108 stand from the reflective surface 101a, and extend in a direction along the reflective surface 101a.

As shown in FIG. 1, it is preferable that the direction in which the heat dissipation fins 108 extend matches with the y-axis direction. A force directed perpendicularly upward is added to the air whose temperature has been increased by heat dissipation of the heat dissipation fins 108 as the density decreases. Accordingly, by arranging the heat dissipation fins 108 in the y-axis direction, heat can be dissipated efficiently without hampering the natural convection of the air traveling to the perpendicularly upper side from the perpendicularly lower side.

Figure 2:
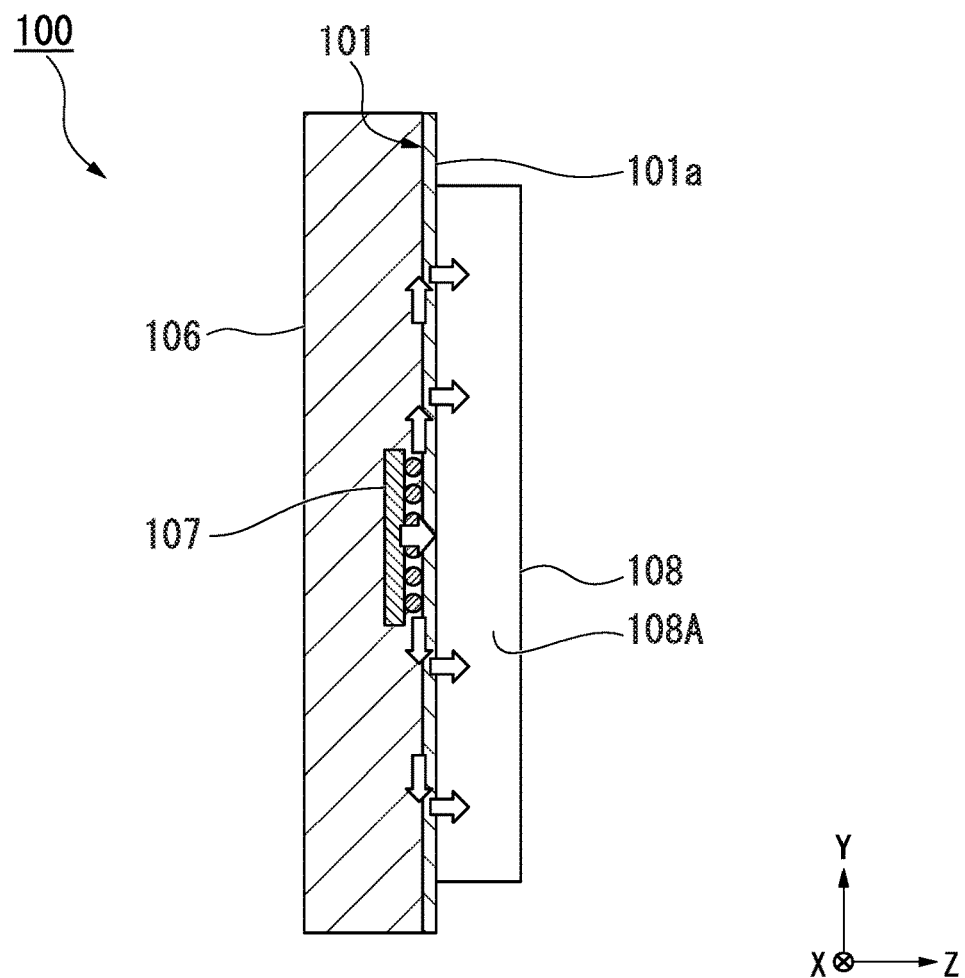
FIG. 2 is a schematic diagram showing heat dissipation flows in the wireless communication device according to the first exemplary embodiment of the present invention.

FIG. 2 is a schematic diagram showing heat dissipation flows in the wireless communication device 100 according to the first exemplary embodiment. The wireless communication device 100 shown in FIG. 2 is illustrated as a cross-sectional view from the x-axis negative direction.

As shown in FIG. 2, the heat generated in the communication circuit 107 is transmitted to the heat dissipation fins 108 via the reflector plate 101, and is then dissipated. Since the wireless communication device 100 has the heat dissipation fins 108, the area where heat generated in the wireless communication device 100 comes in contact with air is increased. Therefore, the heat dissipation performance of the wireless communication device 100 is improved.

In the wireless communication device 100 according to the first exemplary embodiment, the heat dissipation fins 108 have a frequency selective surface (FSS) 108A on a part of the surface viewed from the x-axis direction. The frequency selective surface is a surface on which conductive parts are arranged in a regular manner. Since the heat dissipation fins 108 have the frequency selective surface 108A, electromagnetic waves of a specific band can be transmitted or reflected.

When a part of the frequency selective surface 108A of the heat dissipation fins 108 is in contact with the reflector plate 101, the heat dissipation efficiency of the wireless communication device 100 is further improved. The reason for this is that the conductive parts constituting the frequency selective surface 108A receive the heat transmitted from the reflector plate 101, so that the wireless communication device 100 dissipates more heat.

Various methods may be used as a method of providing the frequency selective surface 108A on the heat dissipation fins 108. For example, the frequency selective surface 108A may be provided by forming an opening part in a plate-shaped conductor, or by forming a conductor part on a plate-shaped dielectric body. As a method for forming the conductor part on the plate-shaped dielectric body, there is a method of forming a metal foil such as a copper foil by means of patterning. The patterning process is common in the manufacturing process of printed substrates and the like, and a fine pattern is formed.

The shape of the frequency selective surface 108A is not particularly limited as long as the conductor parts are arranged regularly, and a commonly known configuration may be used.

Figure 3A:
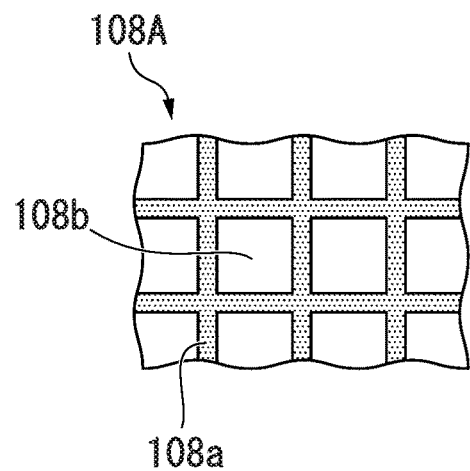
FIG. 3A is a plan view schematically showing a shape of a frequency selection surface.

For example, as shown in FIG. 3A, the frequency selective surface 108A may be formed of a grid-shaped conductive part 108a that is formed by two straight lines orthogonal to each other, and an opening part 108b may be provided on the inner side of the conductive part 108a.

Figure 3B:
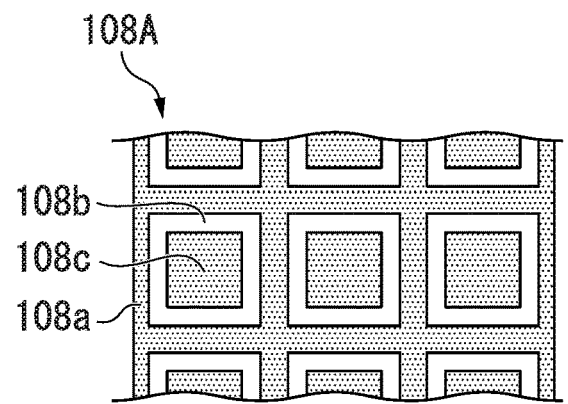
FIG. 3B is similarly a plan view schematically showing a shape of an example of the frequency selection surface.

Furthermore, for example, as shown in FIG. 3B, the frequency selective surface 108A may be formed of a grid-shaped conductive part 108a, and second conductive parts 108c provided on a further inner side of the opening part 108b which is provided on the inner side of the conductive part 108a.

Figure 3C:
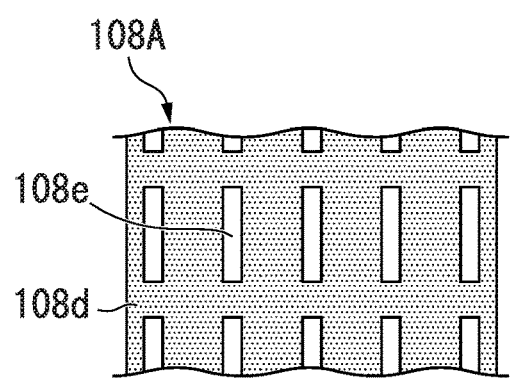
FIG. 3C is similarly a plan view schematically showing a shape of an example of the frequency selection surface.

Moreover, for example, as shown in FIG. 3C, the frequency selective surface 108A may be formed of a conductive part 108d in which there are provided rectangular opening parts 108e each having long edges and short edges.

Figure 3D:
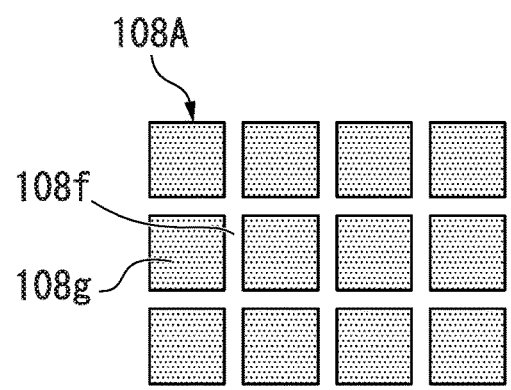
FIG. 3D is similarly a plan view schematically showing a shape of an example of the frequency selection surface.

Furthermore, for example, as shown in FIG. 3D, the frequency selective surface 108A may be formed of conductive parts 108g that are separated by a grid-shaped opening part 108f extending in two directions orthogonal to each other.

Figure 3E:
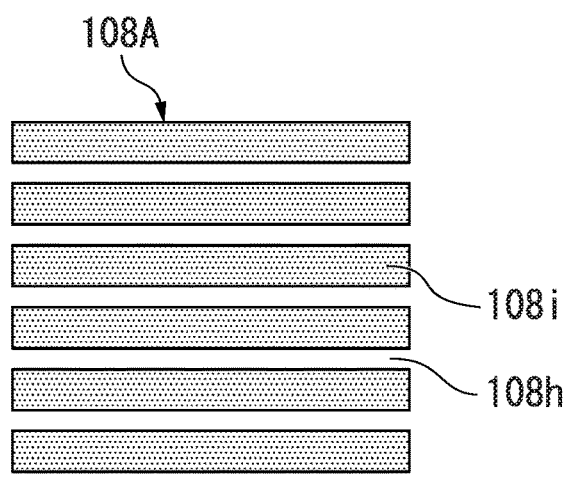
FIG. 3E is similarly a plan view schematically showing a shape of an example of the frequency selection surface.

Moreover, for example, as shown in FIG. 3E, the frequency selective surface 108A may be formed of conductive parts 108i that are separated by slit-shaped opening parts 108h.

The heat dissipation fins 108 on which the frequency selective surface 108A shown in FIG. 3A to FIG. 3C are formed, function as a bandpass type frequency selective member capable of transmitting electromagnetic waves of a specific band. On the other hand, the heat dissipation fins 108 on which the frequency selective surface 108A shown in FIG. 3D to FIG. 3E is formed, function as a band-reject type frequency selective member capable of rejecting electromagnetic waves of a specific band.

In the case where the heat dissipation fins 108 are made of a plate-shaped conductor having opening parts, the opening parts constituting the frequency selective surface 108A mentioned above are formed in the plate-shaped conductor. As shown in FIG. 3B and FIG. 3D, when the conductor part is disposed in the opening part, the conductor part is supported by an arbitrary supporting part. On the other hand, in the case where the heat dissipation fins 108 are made of a plate-shaped dielectric body having conductive parts, the frequency selective surface 108A mentioned above is patterned on one or both of the planes of the plate-shaped dielectric body.

As described above, when the heat dissipation fins 108 have the frequency selective surface 108A, the heat dissipation fins 108 are capable of transmitting electromagnetic waves of a specific band. That is to say, it is possible to prevent electromagnetic waves radiated from the antenna element 102, from being hindered by the heat dissipation fins 108. That is to say, even if the heat dissipation fins are not provided on the back side of the reflector plate as in the conventional case, it is possible to prevent the heat dissipation fins from obstructing wireless communication, and it is possible to reduce the size of the wireless communication device 100.

Figure 4:
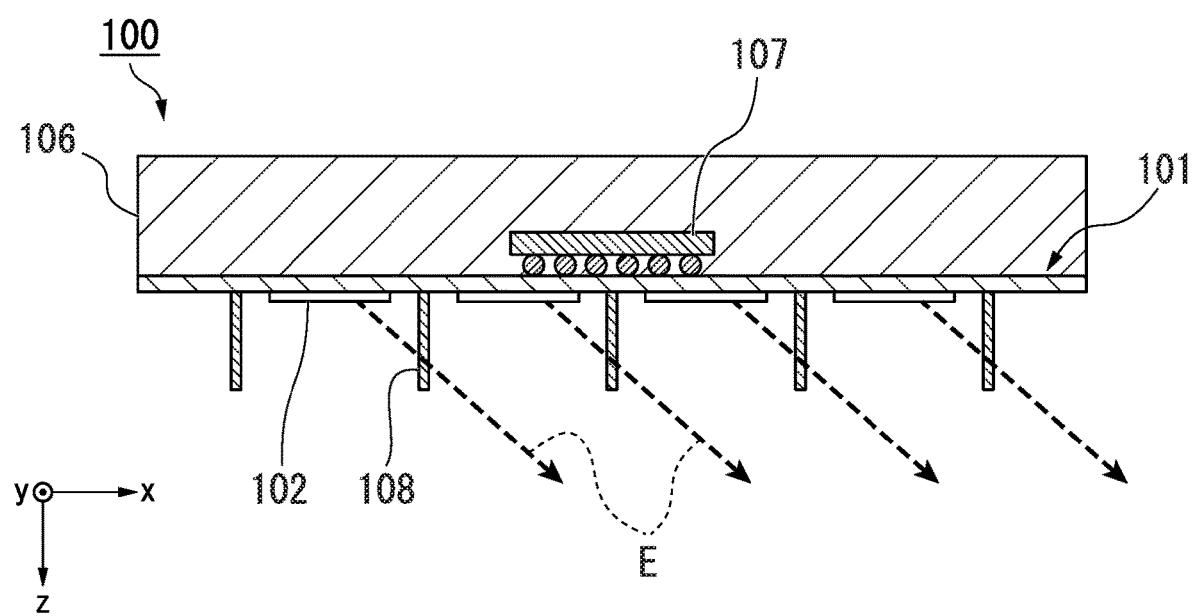
FIG. 4 is a cross-sectional schematic diagram showing electromagnetic waves being radiated from antenna elements in the wireless communication device according to the first exemplary embodiment of the present invention.

FIG. 4 is a cross-sectional schematic diagram showing electromagnetic waves E being radiated from antenna elements 102 in the wireless communication device 100 according to the first exemplary embodiment of the present invention. The electromagnetic waves E radiated from the antenna elements 102 are radiated with orientation in various directions for beam forming. Therefore, the electromagnetic waves E radiated with a predetermined angle from the z-axis direction are incident on the heat dissipation fins 108. Since the heat dissipation fins 108 have the frequency selective surface 108A, the electromagnetic waves E radiated from the antenna element 102 can pass through the heat dissipation fins 108.

For example, when the frequency selective surface 108A transmits an electromagnetic wave of a specific band, the frequency band that the frequency selective surface 108A can transmit is set so as to include the frequency band of the electromagnetic waves E radiated from the antenna element 102. By setting the frequency band that the frequency selective surface 108A can transmit in this manner, the frequency selective surface 108A can transmit the electromagnetic waves E radiated from the antenna element 102 without obstructing them. Moreover, for example, when the frequency selective surface 108A reflects an electromagnetic wave of a specific band, the frequency band that the frequency selective surface 108A can reflect is set so as to be different from the frequency band of the electromagnetic waves E radiated from the antenna element 102. By setting the frequency band that the frequency selective surface 108A can reflect in this manner, the frequency selective surface 108A can reflect the electromagnetic waves E radiated from the antenna element 102 without obstructing them.

In this manner, since the heat dissipation fins 108 can transmit the electromagnetic waves E, the wireless communication device 100 can perform wireless communication with other devices without the radiation angle of the electromagnetic waves E being limited.

As described above, the frequency selective surface 108A of the heat dissipation fins 108 has the conductor part. Since the conductor part has excellent heat conductivity, the wireless communication device 100 can obtain high heat dissipation characteristics as compared with the case where the heat dissipation fins 108 are made of a dielectric material only.

Next, an operation of the wireless communication device 100 will be described.

Figure 5A:
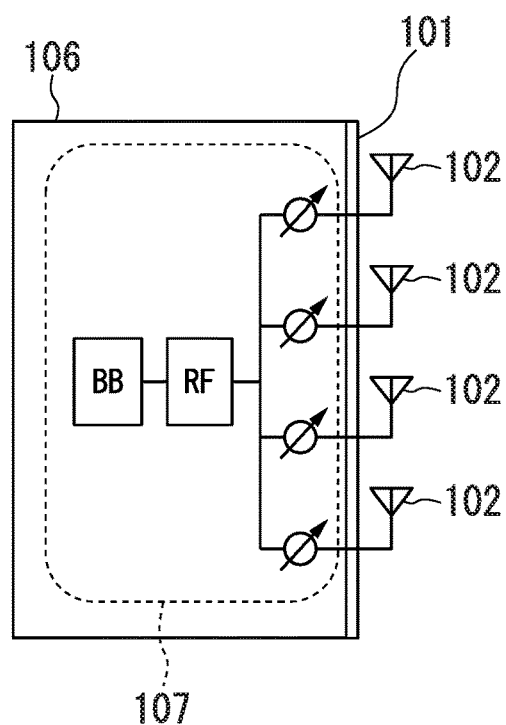
FIG. 5A is a diagram schematically showing an example of a device configuration of the wireless communication device according to the first exemplary embodiment of the present invention.

FIG. 5A is a diagram schematically showing an example of a device configuration of the wireless communication device 100. The wireless communication device 100 of FIG. 5A is such that one communication circuit 107 is configured to include phase shifters, a radio circuit (RF), and a baseband circuit (BB). However, one phase shifter is provided for each antenna element 102. With such a configuration, phase can be changed for each antenna element 102. Therefore the beam directionality can be controlled.

Figure 5B:
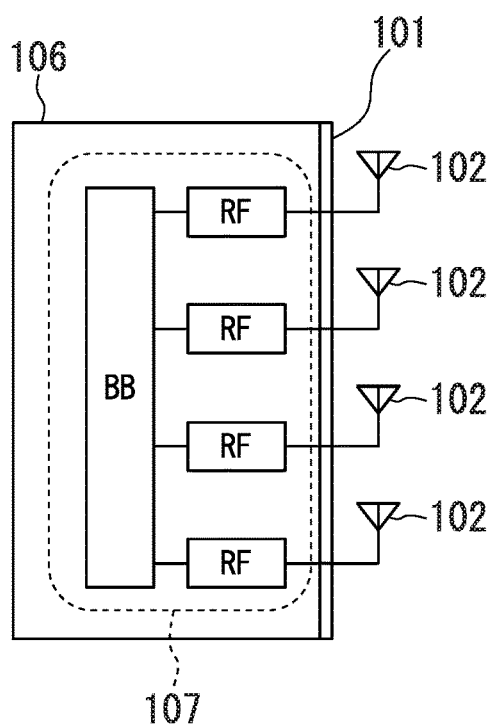
FIG. 5B is similarly a diagram schematically showing an example of a device configuration of the wireless communication device according to the first exemplary embodiment of the present invention.

Another example of the device configuration of the wireless communication device 100 is shown in FIG. 5B. The wireless communication device 100 of FIG. 5B is such that one communication circuit 107 is configured to include radio circuits (RF) and a baseband circuit (BB). However, one radio circuit is provided for each antenna element 102. With this type of configuration, the wireless communication apparatus 100 can also support spatial multiplex communication, which transmits and receives different wireless signals for each antenna element 102.

Figure 5C:
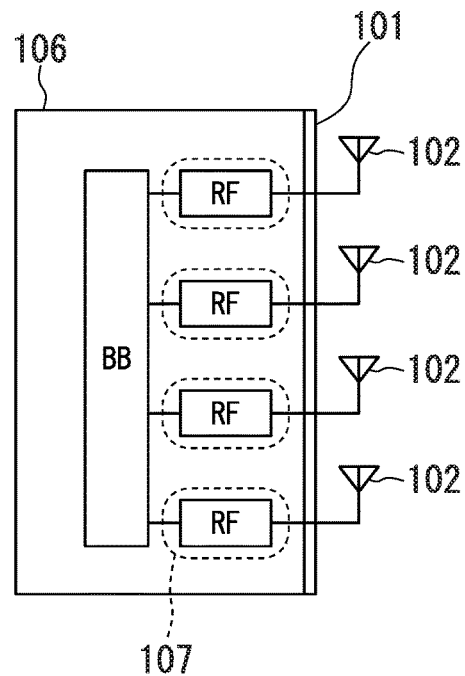
FIG. 5C is similarly a diagram schematically showing an example of a device configuration of the wireless communication device according to the first exemplary embodiment of the present invention.

Moreover, still another example of the device configuration of the wireless communication device 100 is shown in FIG. 5C. The wireless communication device 100 of FIG. 5C is such that a plurality of communication circuits 107 are configured to respectively include a radio circuit (RF). That is to say, the communication circuit 107 is provided for each antenna element 102. With this type of configuration, the wireless communication apparatus 100 can also support spatial multiplex communication, which transmits and receives different wireless signals for each antenna element 102.

However, the device configuration of the wireless communication device 100 is not necessarily limited to those of FIG. 5A, FIG. 5B, and FIG. 5C. For example, in FIG. 5A and FIG. 5B, the communication circuit 107 may not be configured to include the baseband circuit (BB). Alternatively, the configuration may be such that the baseband circuit (BB) is arranged outside the wireless communication device 100, or other configurations may be adopted.

As described above, the wireless communication device 100 according to the first exemplary embodiment of the present invention can improve the heat dissipation performance of the heat generated in the communication circuit 107 by means of the heat dissipation fins 108. If the communication circuit 107 generates heat in connection with transmission and reception of wireless signals, there is a possibility that there may be an influence on the operation of the communication circuit 107 and other circuits (not shown in the figure). That is to say, improving the heat dissipation performance by means of the heat dissipation fins 108 enables stable operation of the wireless communication device 100.

Further, the wireless communication device 100 according to the first exemplary embodiment of the present invention has the frequency selective surface 108A in the heat dissipation fin 108. This frequency selective surface 108A is capable of transmitting electromagnetic waves of a specific band. Therefore, the wireless communication device 100 sets the frequency band of the electromagnetic wave radiated from the antenna element 102 to be within the frequency band of the electromagnetic wave that the heat dissipation fin 108 is capable of transmitting, so that it is possible to prevent the heat dissipation fin 108 from hindering wireless communication performed by the antenna element 102.

Although the wireless communication device according to the first exemplary embodiment of the present invention has been described above with reference to the figures, various modifications may be made to the above configurations without departing from the scope of the invention.

For example, in the present exemplary embodiment, since the communication circuit 107 is built into the casing part 106, it is disposed on the surface on the opposite side to the reflective surface 101a of the reflector plate 101. However, as long as the communication circuit 107 can transfer heat to the reflector plate 101, the communication circuit 107 may be arranged in any way. Further, as long as the communication circuit 107 and the reflector plate 101 are connected by means of a material having high thermal conductivity, the communication circuit 107 need not necessarily be connected directly to the reflector plate 101. Moreover, the communication circuit 107 may be disposed on the reflective surface 101a side of the reflector plate 101, or may be disposed at another position.

Further, for example, the wireless communication device 100 according to the first exemplary embodiment of the present invention may be of a configuration that does not have the frequency selective surface 108A in the heat dissipation fin 108.

First, when the heat dissipation fin 108 is made of a conductor, the height of the heat dissipation fin 108 is set not greater than the height of the antenna element 102 so that the antenna element 102 will not disturb the electromagnetic wave radiated from the antenna element 102. By setting the height of the heat dissipation fins 108 low in this manner, the wireless communication device 100 can obtain excellent heat dissipation characteristics while preventing the heat dissipation fin 108 from obstructing electromagnetic waves.

The heat dissipation fin 108 in this case may be formed for example from sheet metal, or may be formed integrally with the reflection plate 101 by metal cutting or the like. Also, other conductors may be used.

In addition, in the case where at least a part of the heat dissipation fin 108 is formed of a dielectric body with high thermal conductivity, this heat dissipation fin 108 has a lower thermal conductivity than the frequency selective surface formed of the conductor.

However, this heat dissipation fin 108 transmits electromagnetic waves. Therefore, the wireless communication device 100 according to the first exemplary embodiment of the present invention can obtain constant heat dissipation characteristics while preventing the heat dissipation fin 108 from obstructing electromagnetic waves. The heat dissipation fin 108 in this case may be formed for example from a ceramic material or the like. Also, this may be some other highly thermally conductive dielectric body.

Furthermore, a non-conductive protective film may be provided on the surface of the heat dissipation fin 108. According to such a configuration, it is possible to protect the heat dissipation fin 108 from outdoor rain, snow, and dust, and it is possible to improve the weather resistance of the wireless communication device 100. The protective film preferably has, for example, water repellency and water resistance, but may indeed have other properties.

Second Exemplary Embodiment

Figure 6:
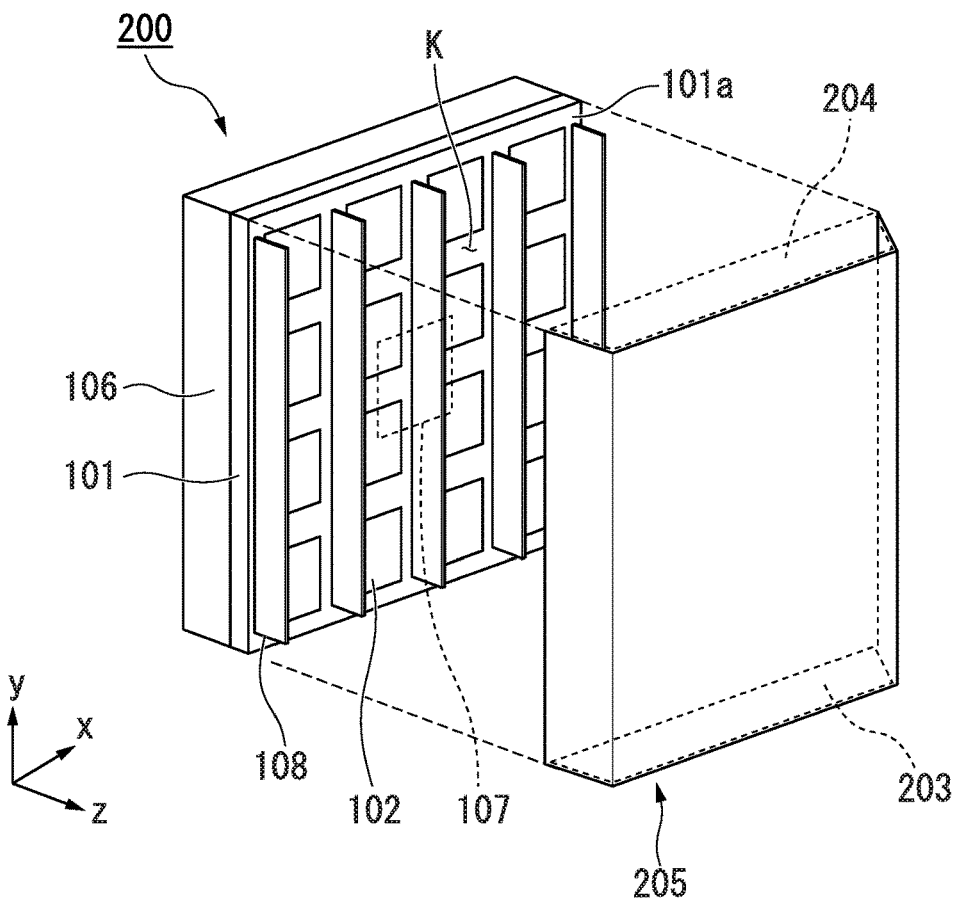
FIG. 6 is a perspective schematic diagram showing a wireless communication device according to a second exemplary embodiment of the present invention.

FIG. 6 is a perspective schematic diagram of a wireless communication device 200 according to a second exemplary embodiment of the present invention. The wireless communication device 200 according to the second exemplary embodiment is different from the wireless communication device 100 according to the first exemplary embodiment in that a radome 205 is provided. The same components as those of the wireless communication device 100 according to the first exemplary embodiment are denoted by the same reference symbols, and a detailed description thereof will be omitted. In FIG. 6, for ease of understanding, the reflector plate 101 and the radome 205 are shown separated from each other.

The radome 205 is a member that covers the reflective surface 101a of the reflector plate 101. The radome 205 has openings on the perpendicularly upper side and perpendicularly lower side. That is to say, a ventilation flow path K surrounded by the radome 205 and the reflector plate 101 is formed. In the ventilation flow path K, a plurality of antenna elements 102 provided on the reflective surface 101a are accommodated. Since the antenna elements 102 and so forth are covered by the radome 205, the wireless communication device 200 can protect the antenna elements 102 from physical shock.

The radome 205 shown in the figure has a shape having corner parts. However, the shape of the radome 205 is not particularly limited as long as it can cover the reflective surface 101a. For example, the radome may be a shape having a curved plane that covers the reflective surface 101a.

It is preferable that the radome 205 be composed of a dielectric material, or have a frequency selective surface having conductive parts arranged regularly thereon.

In the case where the radome 205 is composed of a dielectric material, the radome 205 can transmit electromagnetic waves radiated from the antenna element 102 accommodated in the ventilation flow path K. Moreover, in the case where the radome 205 has the frequency selective surface having conductive parts arranged regularly thereon, the radome 205 can transmit electromagnetic waves of a specific band. For the frequency selective surface formed on the radome 205, one that is the same as the frequency selective surface 108A having the heat dissipation fin 108 in the first exemplary embodiment may be used (refer to FIG. 3A to FIG. 3E).

When a part of the frequency selective surface of the radome 205 is in contact with the reflector plate 101, the heat dissipation efficiency of the wireless communication device 200 is further improved. The reason for this is that the conductive parts constituting the frequency selective surface are heated by the heat transmitted from the reflector plate 101, so that the wireless communication device 200 dissipates more heat.

The radome 205 in FIG. 6, has openings on the perpendicularly upper side and perpendicularly lower side. The air whose temperature has been increased as a result of the heat dissipation is directed toward the perpendicularly upper side as the density decreases. As a result, the perpendicularly lower side opening of the radome 205 serves as an air inlet 203, and the perpendicularly upper side opening serves as an air outlet 204.

In the ventilation flow path K formed by the radome 205, air flows due to natural convection. The air whose temperature has been raised, flows from the air inlet 203 side to the air outlet 204 side by natural convection. When the air in the ventilation flow path K flows from the air inlet 203 side to the air outlet 204 side, the air density on the air inlet 203 side becomes lower and air is supplied from the outside. That is to say, by providing the radome 205, continuous natural convection (so-called chimney effect) directed from the air inlet 203 to the air outlet 204 is formed. As a result, fresh outside air is always supplied to the reflective surface 101a of the reflector plate 101 and to the surface of the heat dissipation fins 108 to which the heat generated by the communication circuit 107 has been transferred, so that the heat radiation efficiency of the wireless communication device 200 is further improved.

Figure 7:
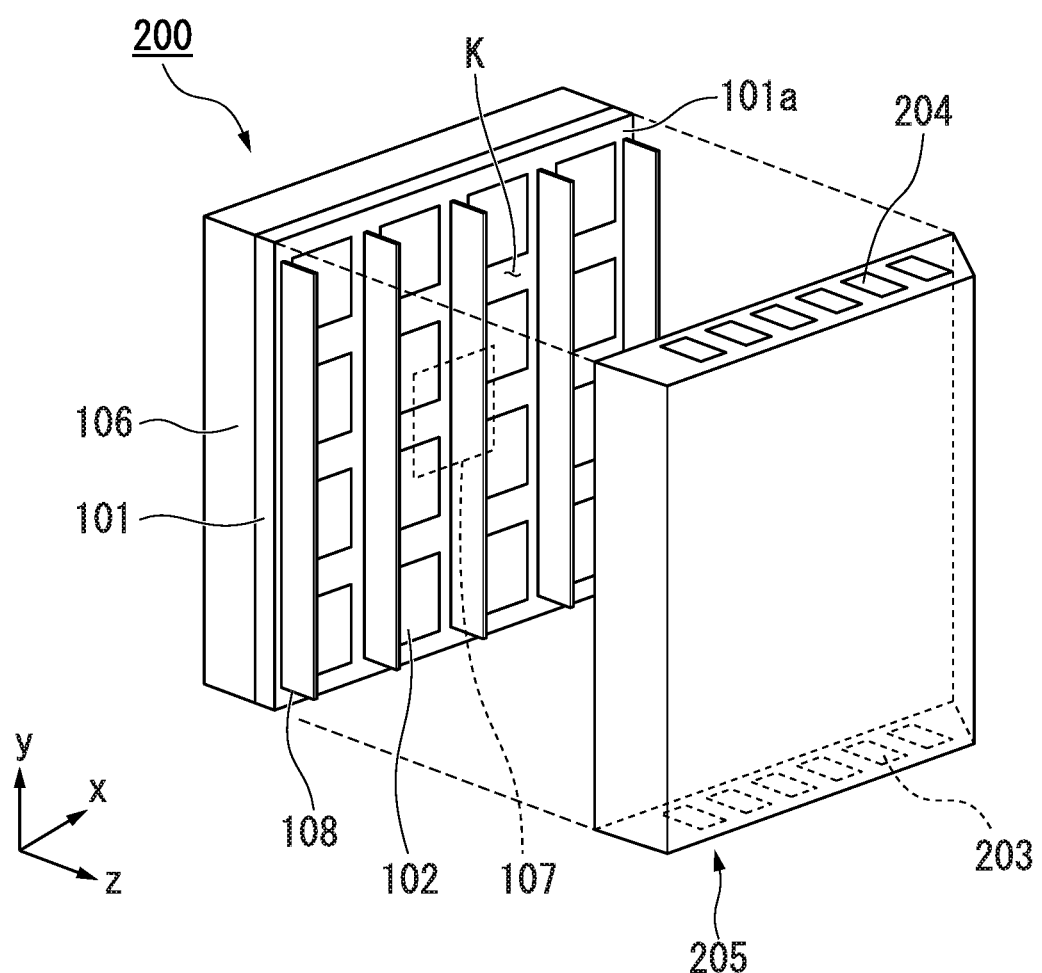
FIG. 7 is a perspective schematic diagram of a modified example of the wireless communication device according to the second exemplary embodiment of the present invention.

In FIG. 6, as an example of the air inlet 203 and the air outlet 204, there are shown openings in which the entire perpendicularly lower side face and the entire perpendicularly upper side face of the radome 205 are removed. However, the openings of the air inlet 203 and the air outlet 204 need not necessarily be configured by removing the entire faces. For example, as shown in FIG. 7, the air inlet 203 and the air outlet 204 may be openings having a portion of each of the perpendicularly lower side and perpendicularly upper side faces of the radome 205.

In the present exemplary embodiment, the radome 205 has openings (air outlet 204 and air inlet 203) on the perpendicularly upper side and perpendicularly lower side, respectively. However, as long as the wireless communication device 200 can capture wind into the interior of the radome 205, the positions and the number of the openings are not limited to this. For example, the radome 205 may have an air inlet 203 and an air outlet 204 on other faces (that is, side faces of the radome 205) other than the perpendicularly upper side and perpendicularly lower side faces, or may have an air inlet 203 and an air outlet 204 on any of the perpendicularly upper side face, the perpendicularly lower side face, and the side face. Furthermore, the radome 205 may have one opening in which the air inlet 203 and the air outlet 204 are integrated, or may also have one or more air inlets 203 and one or more air outlet 204.

Examples of the radome 205 having a plurality of air inlets 203 and a plurality of air outlets 204 include a structure in which the radome 205 has openings on the perpendicularly upper side, the perpendicularly lower side, and the side face. Also in the case where the wireless communication device 200 having this configuration is arranged outdoor, outdoor natural wind is taken into the interior of the radome 205, so that the heat dissipation efficiency of the wireless communication device 200 is further improved.

Figure 8:
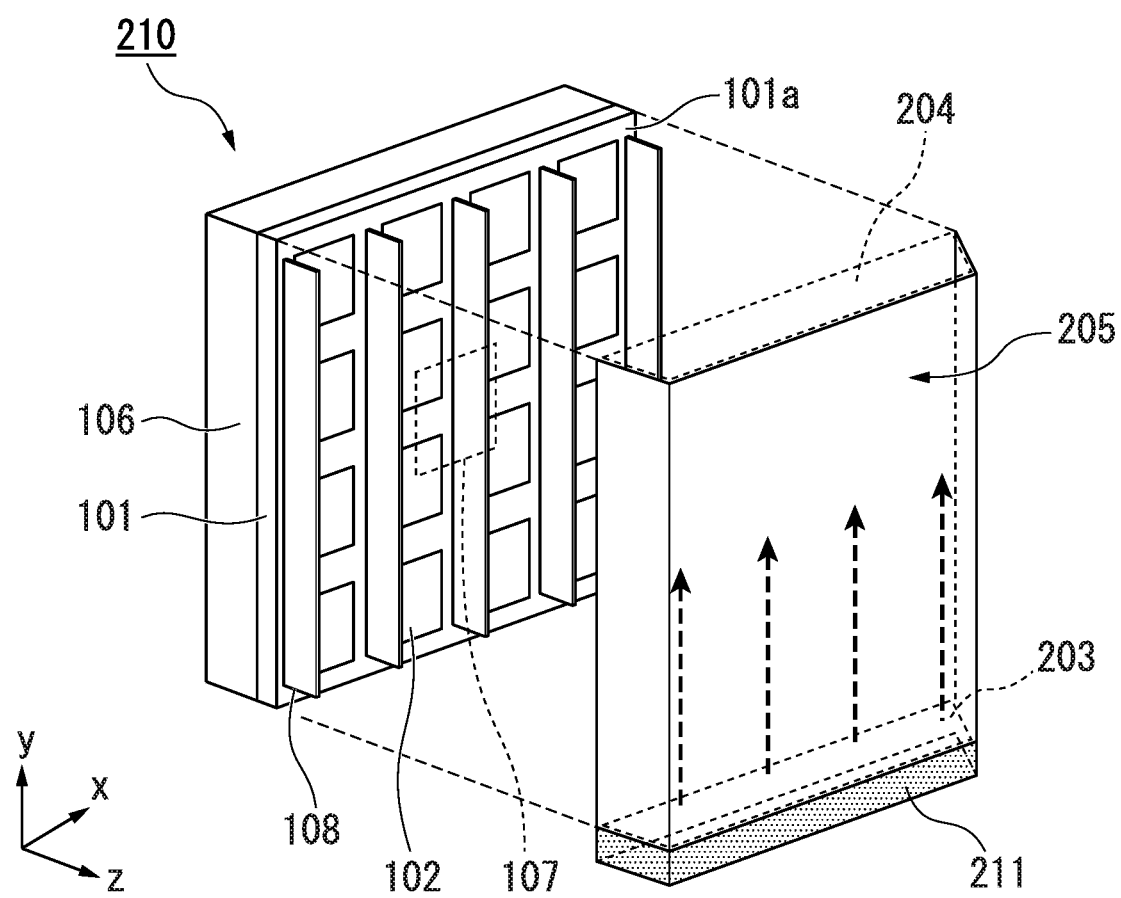
FIG. 8 is a perspective schematic diagram of a modified example of the wireless communication device according to the second exemplary embodiment of the present invention.

Furthermore, the flow of air in the ventilation flow path is not limited to natural convection. For example, as shown in FIG. 8, a wireless communication device 210 may have a fan 211 on the air inlet 203 side. As the fan 211 is rotationally driven by electric power supplied from the outside, the fan 211 introduces air from the outside into the interior of the ventilation flow path. As a result, forced air convection is formed in the ventilation flow path.

According to this type of configuration, the wireless communication device 210 can obtain a more efficient and favorable heat dissipation effect as compared with the heat dissipation only by means of the natural convection of air. Note that the fan 211 may be provided in another location as long as a forced air convection can be formed in the ventilation flow path.

For example, even with a configuration where the fan 211 is provided in the air outlet 204, the wireless communication device 210 can obtain a similar effect. Further, the fan 211 may be provided in both of the air inlet 203 and the air outlet 204.

Figure 9:
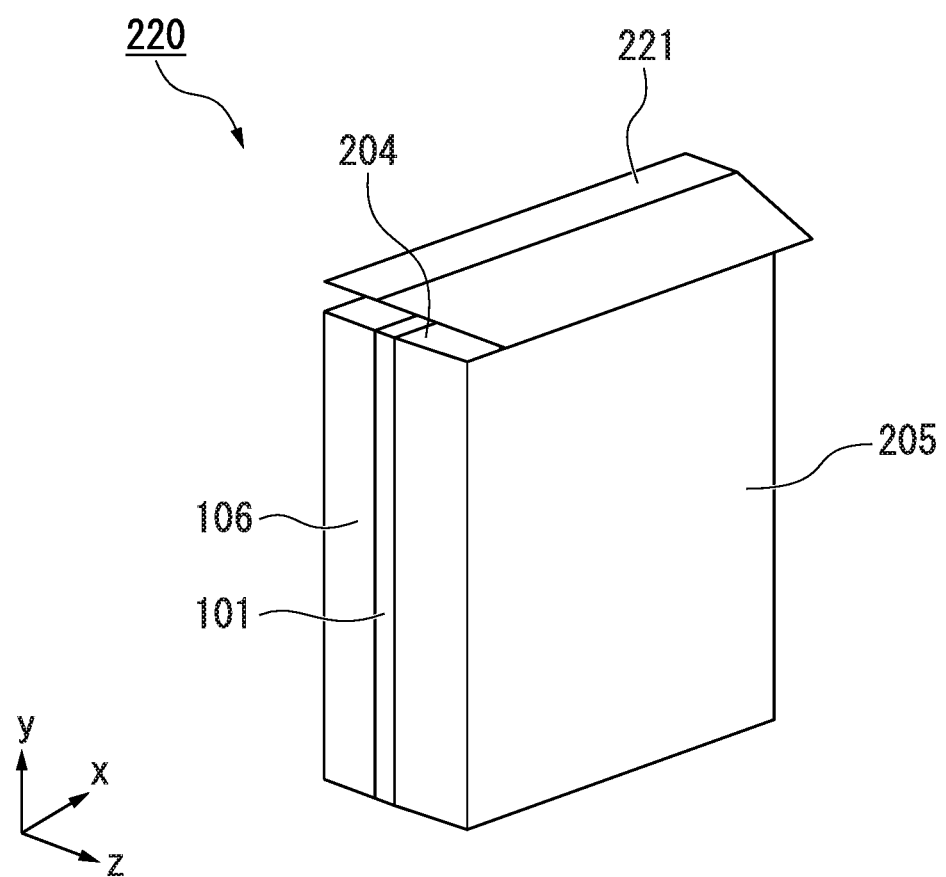
FIG. 9 is a perspective schematic diagram of a modified example of the wireless communication device according to the second exemplary embodiment of the present invention.

Also, depending on the environment where the wireless communication device is arranged, as shown in FIG. 9, a wireless communication device 220 may have an eave 221 on the perpendicularly upper side of the air outlet 204. According to this type of configuration, the eave 221 stops rain or snow from entering the interior of the radome 205, and as a result, the weather resistance of the wireless communication device 220 is improved.

Further, the wireless communication device 220 may be provided with air-permeable members that obstruct the air inlet 203 and the air outlet 204. The air-permeable members may be for example a mesh-type member such as a wire mesh, a cloth, or another member. According to this type of configuration, it is possible to prevent rain or snow from entering the interior of the radome 205, and to improve the durability and weather resistance of the wireless communication device 220.

Figure 10:
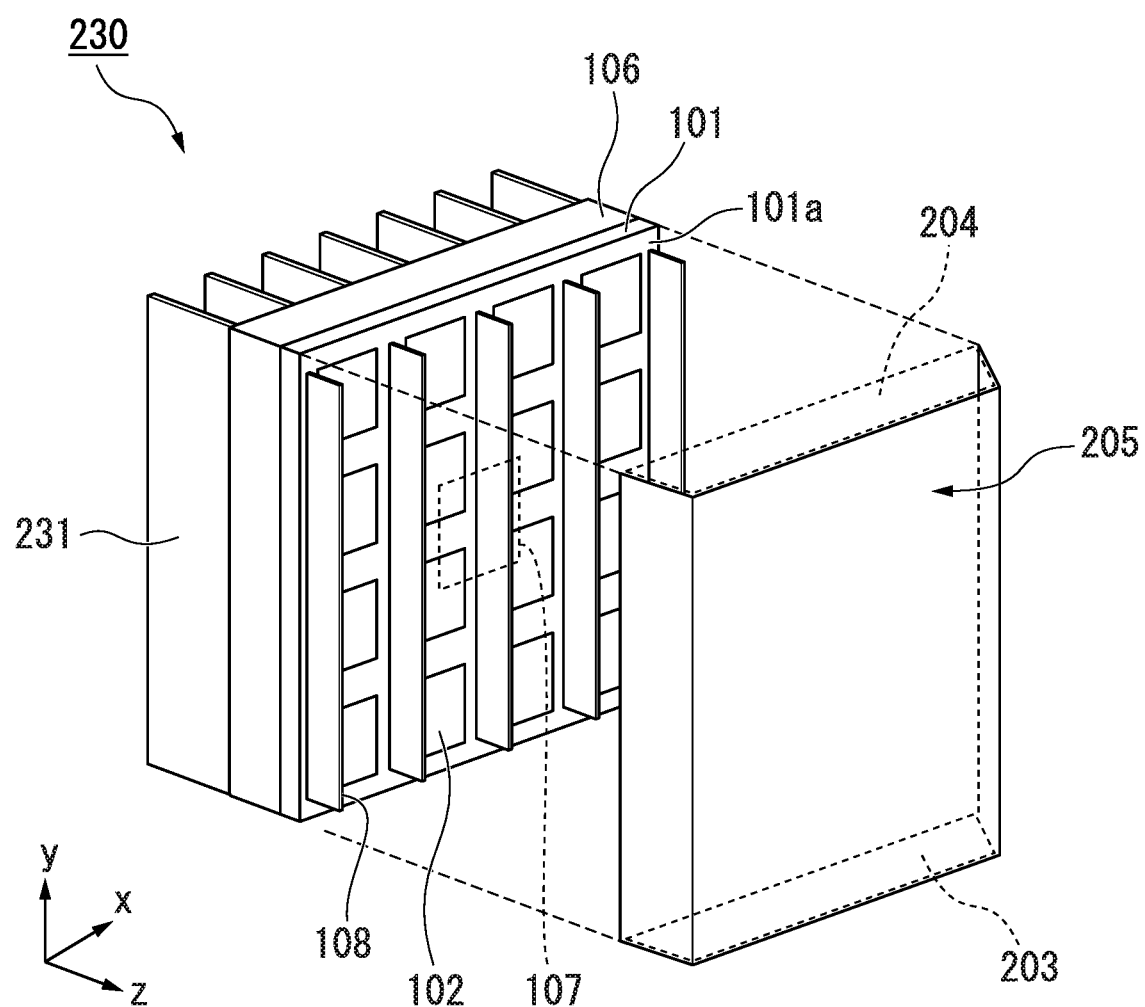
FIG. 10 is a perspective schematic diagram of a modified example of the wireless communication device according to the second exemplary embodiment of the present invention.

Furthermore, as shown in FIG. 10, as long as the environment in which the wireless communication device is disposed allows, a wireless communication device 230 may have a structure in which a heat radiator 231 (heat sink) is provided on the back side of the casing part 106 (a surface on the side opposite to the reflective surface 101a). According to this type of configuration, the heat dissipation performance of the wireless communication device 230 improves further.

As described above, the wireless communication device according to the second exemplary embodiment of the present invention forms a flow path for air convection by having a radome. Therefore, the outside air is efficiently supplied into the interior of the wireless communication device, and the heat dissipation performance of the wireless communication device is improved.

In addition, since the radome is formed of a predetermined material or has a predetermined frequency selective surface, a situation in the wireless communication device where radome obstructs wireless communication can be suppressed.

Third Exemplary Embodiment

Figure 11:
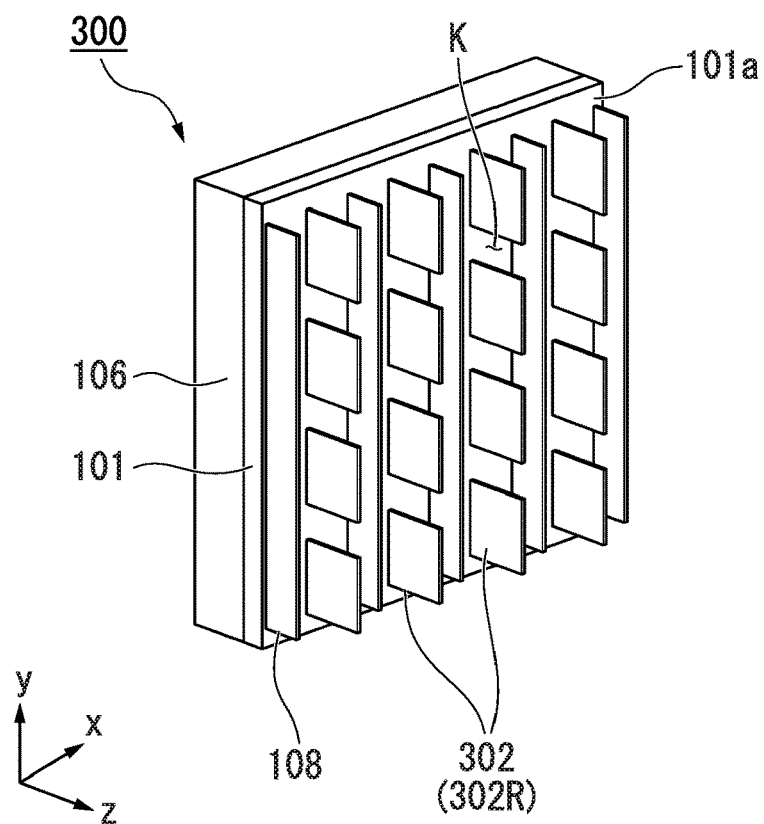
FIG. 11 is a perspective schematic diagram showing a wireless communication device according to a third exemplary embodiment of the present invention.

FIG. 11 is a perspective schematic diagram showing a wireless communication device 300 according to a third exemplary embodiment of the present invention. The wireless communication device 300 according to the third exemplary embodiment is different from the wireless communication device 100 according to the first exemplary embodiment in that antenna elements 302 are standing on the reflective surface 101a. The same components as those of the wireless communication device 100 according to the first exemplary embodiment are denoted by the same reference symbols, and a detailed description thereof will be omitted.

When the antenna element 302 stands up on the reflective surface 101a, both the front face and the back face of the antenna element 302 come in contact with air. Therefore, the heat dissipation performance of the wireless communication device 300 is improved.

As shown in FIG. 11, the thickness-wise direction of the antenna element 302 is oriented in the x-axis direction. As a result, the electromagnetic wave radiated from the antenna elements 302 is incident on the heat dissipation fin 108 that extends in the same direction. Since the heat dissipation fin 108 has the frequency selective surface 108A as with the wireless communication device 100 of the first exemplary embodiment, electromagnetic waves of a specific band can be transmitted. That is to say, in the wireless communication device 300 according to the third exemplary embodiment, the heat dissipation fin 108 can dissipate heat without hindering wireless communication.

Moreover, air whose temperature has been increased as a result of the heat dissipation, is directed toward the perpendicularly upper side as the density decreases. In the case where the antenna element 302 extends in the y-axis direction as with the heat dissipation fin 108, the wireless communication device 300 can prevent a situation where the antenna element 302 hinders the natural convection.

Figure 12:
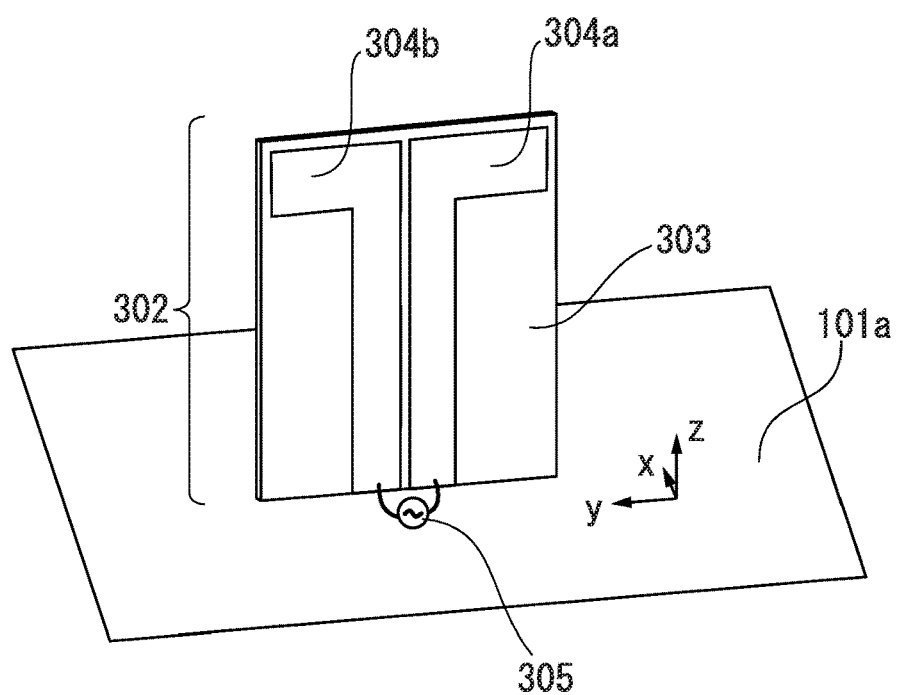
FIG. 12 is a perspective schematic diagram showing an antenna element according to the third exemplary embodiment of the present invention.

As shown in FIG. 12, each antenna element 302 has a plate-shaped dielectric substrate 303, and an antenna pattern 304a and an antenna pattern 304b which are conductor patterns formed on the surface of this dielectric substrate 303. As described above, the dielectric substrate 303 is disposed in a manner such that the thickness-wise direction thereof is oriented in the x-axis direction. The dielectric substrate 303 is formed of, for example, a printed board using a glass epoxy resin, or a ceramic substrate such as LTCC.

In the present exemplary embodiment, a pair of substantially L-shaped printed wires are provided on one face of the dielectric substrate 303. It is desirable that the printed wiring be formed of a material having excellent electrical conductivity and thermal conductivity as with a copper foil, for example. These printed wires are the aforementioned antenna pattern 304a and the antenna pattern 304b, respectively.

Furthermore, the antenna pattern 304a and the antenna pattern 304b are connected to the communication circuit 107 built into the casing part 106 via a feeding point 305. The communication circuit 107 supplies electric power to the antenna pattern 304a and the antenna pattern 304b via the feeding point 305. As a result, the communication circuit 107 excites the antenna element 302.

As described above, the antenna element 302 forms a dipole antenna by means of the antenna pattern 304a and the antenna pattern 304b.

The third exemplary embodiment of the present invention has been described above with reference to the figures. However, various modifications may be made to the above configurations without departing from the scope of the invention.

Figure 13:
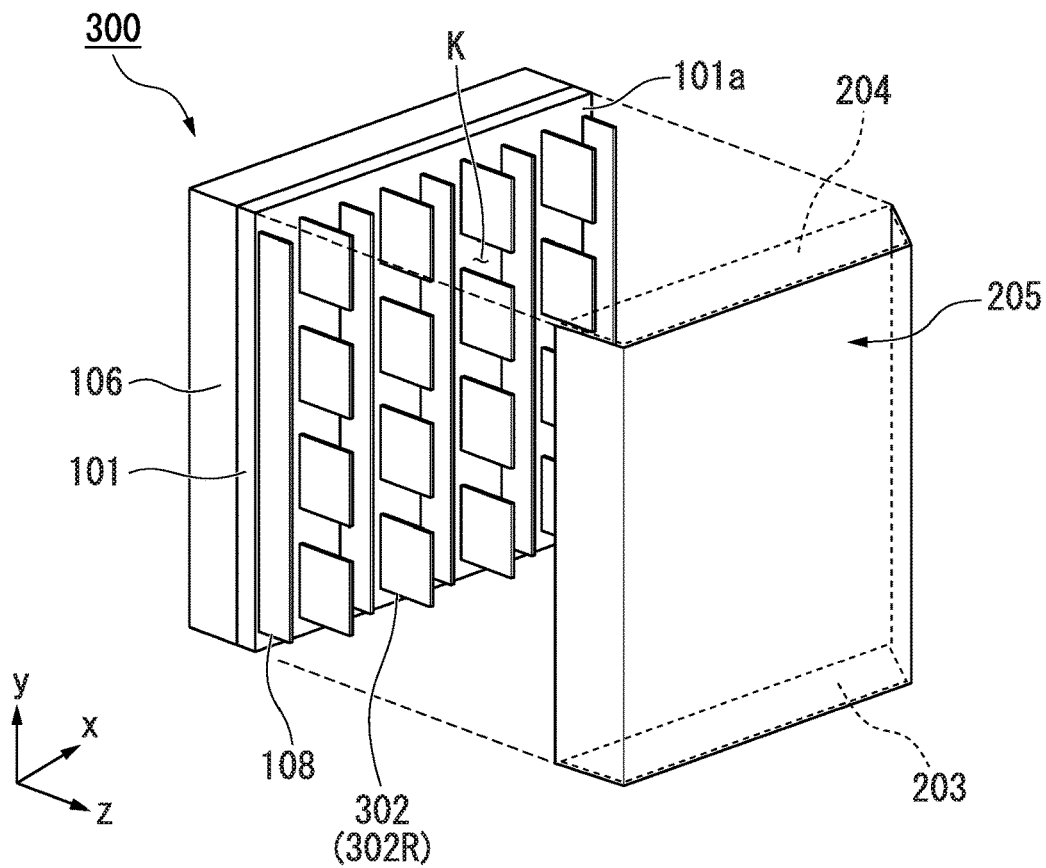
FIG. 13 is a perspective schematic diagram of a modified example of the wireless communication device according to the third exemplary embodiment of the present invention.

For example, as shown in FIG. 13, the reflective surface 101a of the reflector plate 101 preferably has a radome 205. Since the wireless communication device 300 has the radome 205, the wireless communication device 300 can prevent the antenna elements 302 from physical impact. In addition, since the wireless communication device 300 has the radome 205, the wireless communication device 300 can promote natural convection in the ventilation flow path surrounded by the radome 205 and the reflector plate 101. Since the antenna elements 302 extend in the same direction as the that of the heat dissipation plate 108, they do not hinder natural convection.

Furthermore, as long as the environment in which the wireless communication device is disposed allows, a heat radiator (heat sink) similar to that shown in FIG. 10 may be provided on the back side of the casing part 106 (a surface on the side opposite to the reflective surface 101a). According to this type of configuration, the heat dissipation performance of the wireless communication device is further improved.

Furthermore, depending on the environment in which the wireless communication device is arranged, an eave may be provided above the air outlet as with FIG. 9. According to this type of configuration, the wireless communication device prevents rain or snow from entering the interior of the radome, and as a result, the weather resistance of the wireless communication device is improved.

Further, in the exemplary embodiment described above, the example is described in which the antenna pattern 304a and the antenna pattern 304b are provided only on the surface on one side of the dielectric substrate 303. However, the form of the antenna pattern is not limited to this. For example, as shown in FIG. 14, the antenna pattern 304a may be provided on one side surface of the dielectric substrate 303, and the antenna pattern 304b may be provided on the other side surface.

Figure 14:
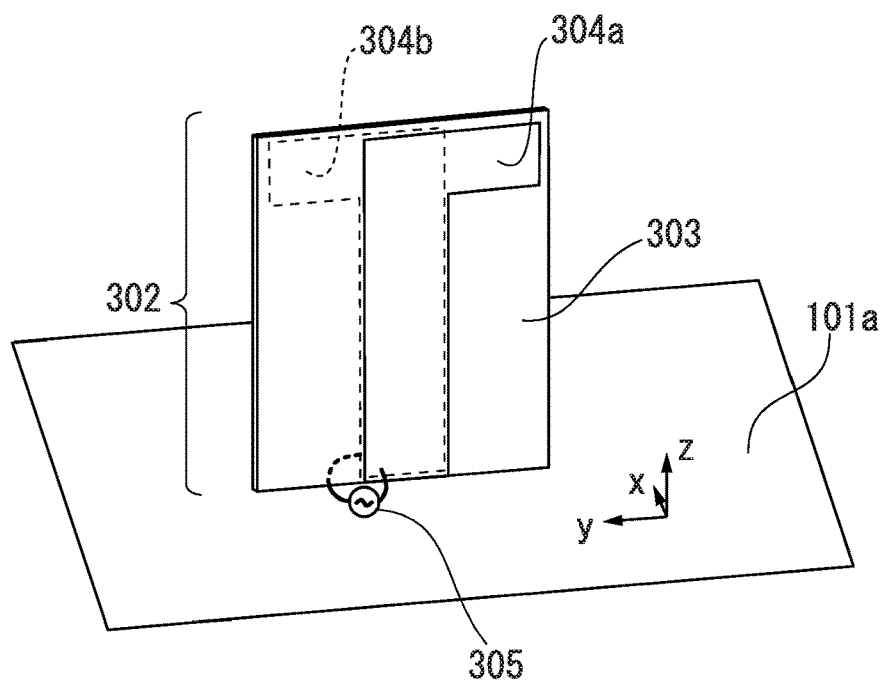
FIG. 14 is a diagram showing another modified example of the antenna element according to the third exemplary embodiment of the present invention.

The antenna used for the antenna element 302 is not limited to the dipole antenna shown in FIG. 12 and FIG. 14, and may be an antenna using a split ring resonator.

Figure 15:
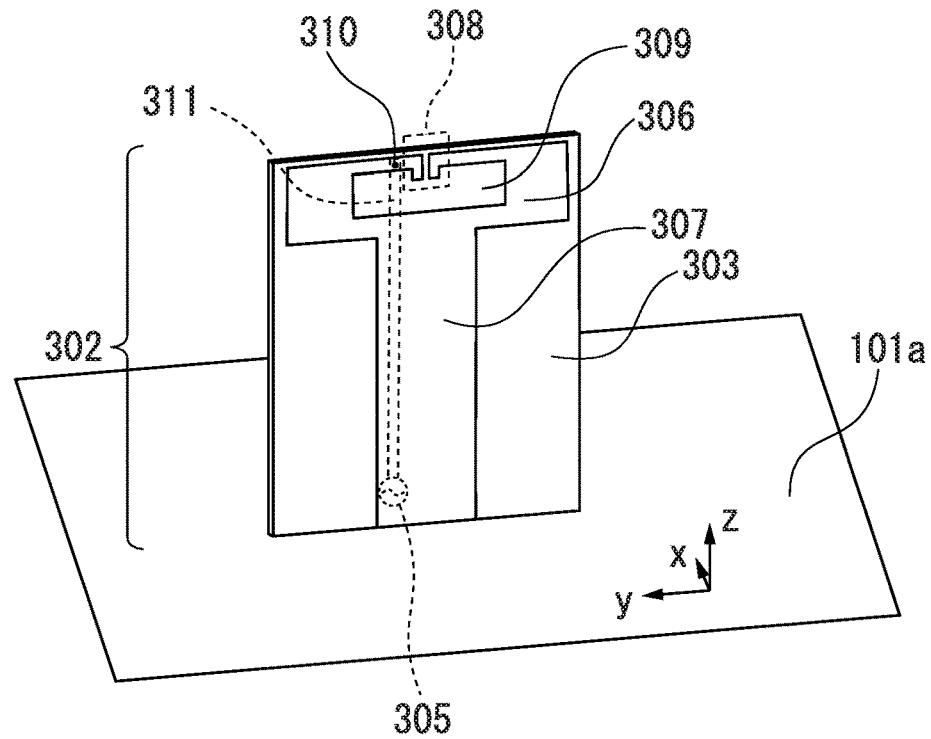
FIG. 15 is a diagram showing another modified example of the antenna element according to the third exemplary embodiment of the present invention.
Figure 16:
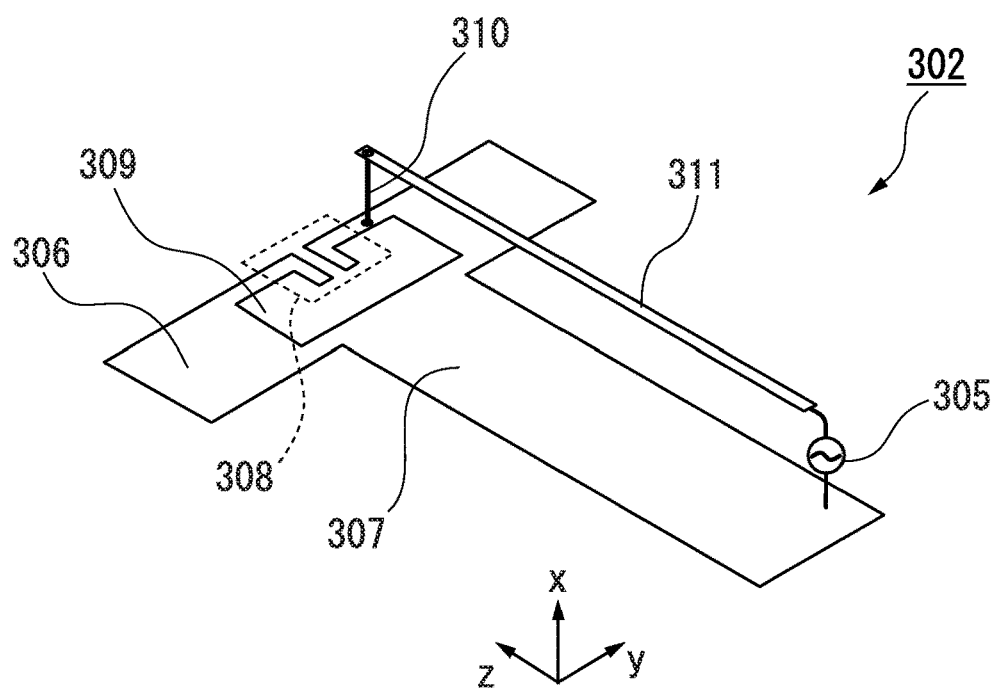
FIG. 16 is a diagram showing another modified example of the antenna element according to the third exemplary embodiment of the present invention.

Specifically, as shown in FIG. 15 and FIG. 16, the antenna element 302 is formed by forming a substantially T-shaped printed wiring on the surface of a dielectric substrate 303. Among the printed wiring, a region on the side in the vicinity of the reflector plate 101 (reflective surface 101a) becomes a substantially rectangular shape, thereby forming a rectangular conductor part 307. On the other hand, the region on the side away from the reflective surface 101a forms a substantially C shape, thereby forming an annular conductor part 306.

In the annular conductor part 306, a split part 308 in which a circumferential part is cut away is formed. As a result, the annular conductor part 306 forms a magnetic field in an inner rectangular region 309 as a coil (inductor), and the split part 308 ensures a certain electrostatic capacitance as a capacitor. With this configuration, a split ring resonator in which the inductor and the capacitor are connected in series is formed.

A feeding line 311 is connected via a feeding via 310 to another part of the annular conductor part 306 around the circumferential direction. Thereby, giving a configuration where wireless signals transferred from the feeding point 305 are input to the split resonator.

The antenna element 302 as such a split ring resonator can be reduced in size as compared with a dipole antenna of the same operating frequency. As a result, it is possible to obtain a wider gap between the antenna elements 302, as compared with the case of using the antenna element 302 as a dipole antenna. With this type of configuration, the communication circuit 107 can be more efficiently cooled.

Figure 17:
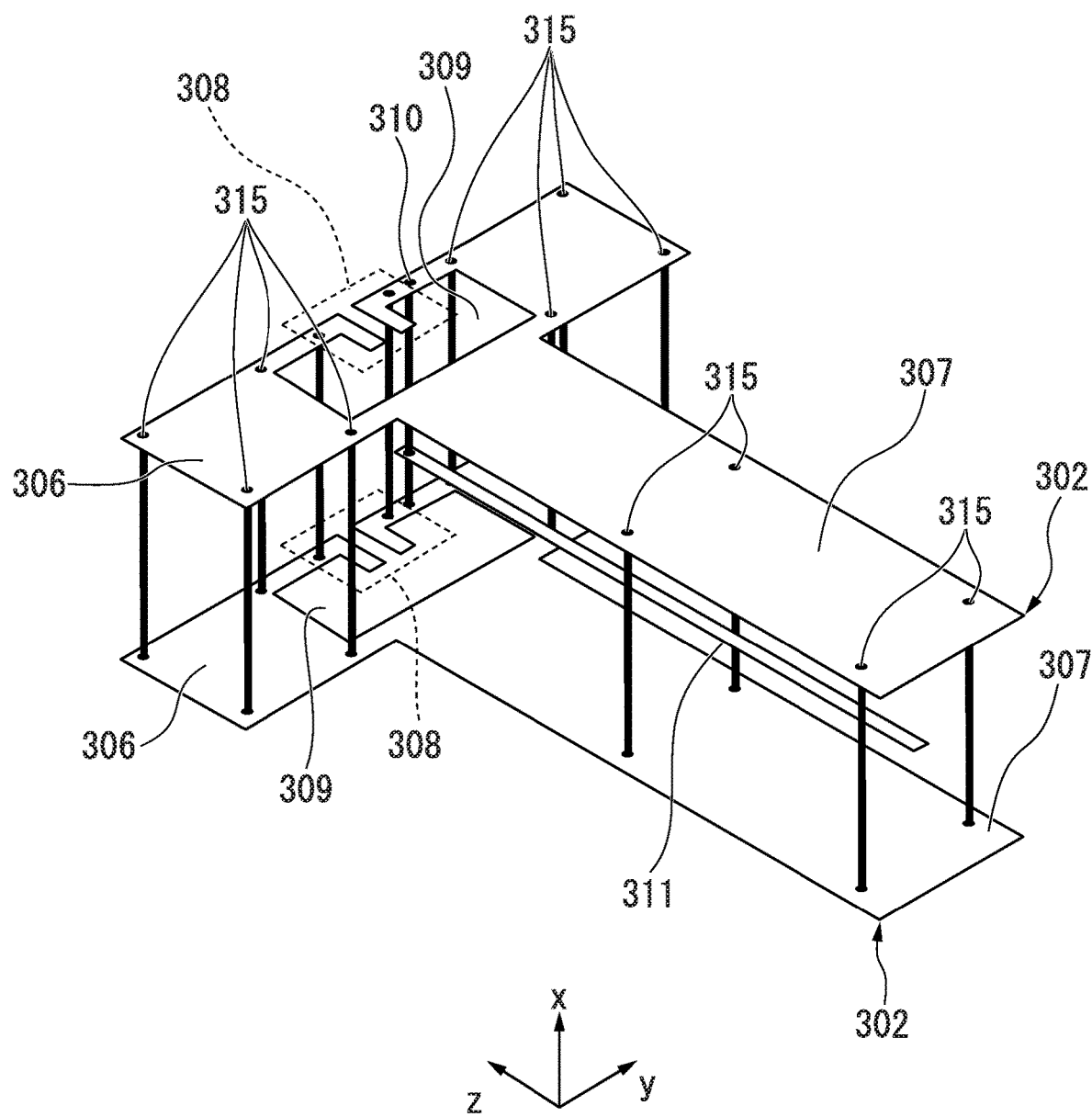
FIG. 17 is a diagram showing another modified example of the antenna element according to the third exemplary embodiment of the present invention.

Furthermore, as shown in FIG. 17, a plurality of antenna elements 302 serving as the above split ring resonators may be laminated, these antenna elements 302 may be connected to each other by means of conductive vias 315, and a conductor feeding line 311 may be provided between the antenna elements 302.

According to such a configuration, shielding performance against the conductor feeding line 311 can be improved by the antenna elements 302 facing each other. That is to say, noise from the outside against the conductor feeder line 311 can be shielded.

As described above, by using the wireless device according to the third exemplary embodiment of the present invention, the area where the standing antenna elements are in contact with air increases. Therefore, more efficient heat dissipation can be performed. Further, since the heat dissipation fin has a predetermined frequency selective surface, it is possible to efficiently dissipate heat without obstructing electromagnetic waves radiated from the antenna elements.

Fourth Exemplary Embodiment

Figure 18:
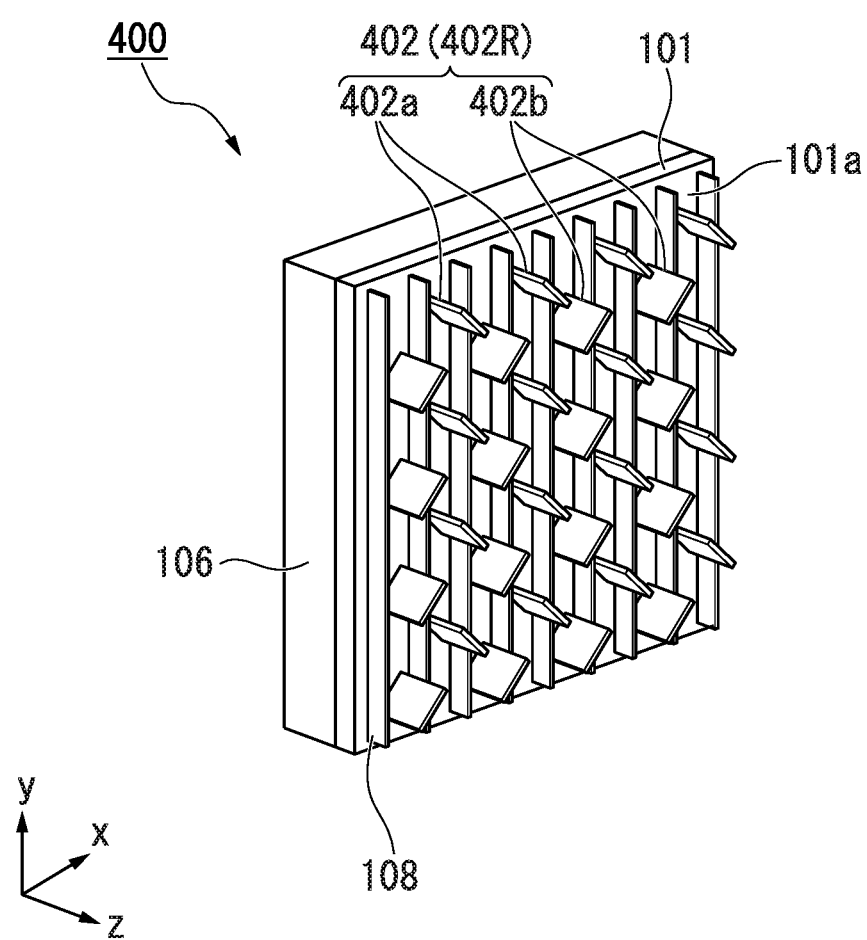
FIG. 18 is a perspective schematic diagram showing a wireless communication device according to a fourth exemplary embodiment of the present invention.
Figure 19:
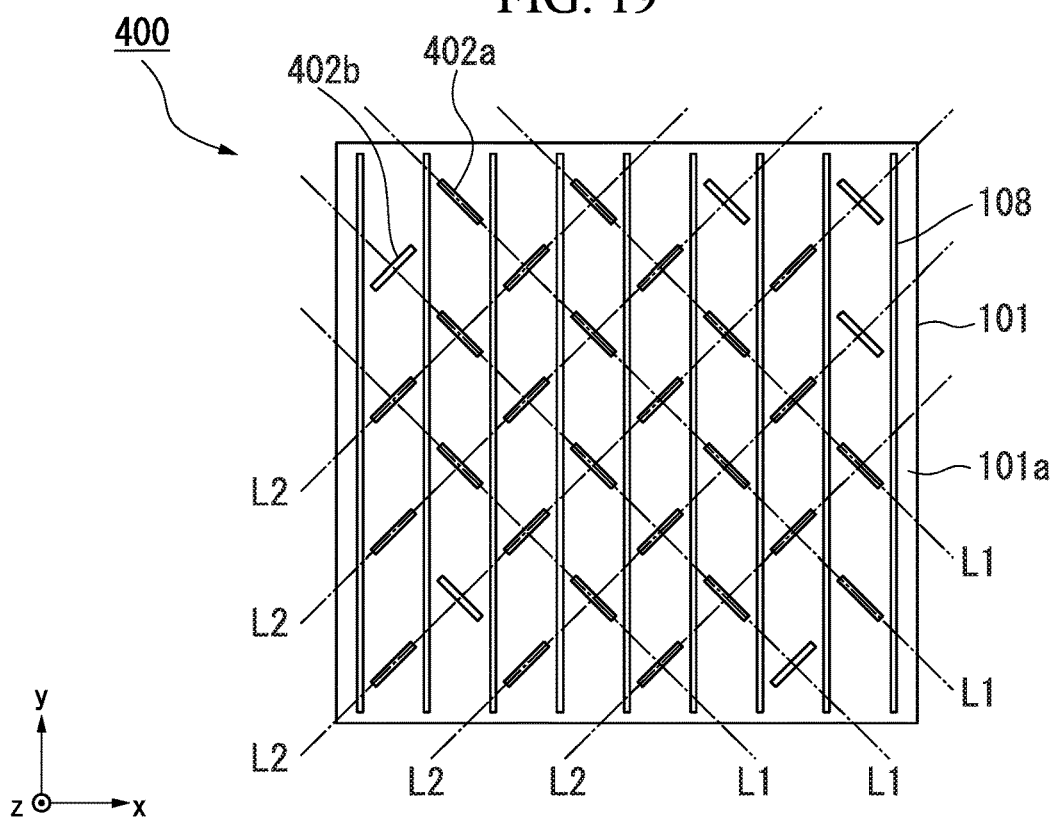
FIG. 19 is a plan schematic diagram showing the wireless communication device according to the fourth exemplary embodiment of the present invention.

FIG. 18 is a perspective schematic diagram of a wireless communication device 400 according to a fourth exemplary embodiment of the present invention. Also, FIG. 19 is a plan schematic diagram of the wireless communication device 400 according to the fourth exemplary embodiment of the present invention. The wireless communication device 400 according to the fourth exemplary embodiment is different from the wireless communication device 300 according to the third exemplary embodiment in that antenna elements 402 are angled with respect to the y-axis direction. The same components as those of the wireless communication device 100 according to the first exemplary embodiment are denoted by the same reference symbols, and a detailed description thereof will be omitted.

The antenna element 402 of the wireless communication device 400 is provided with first element groups L1 each having a plurality of first antenna elements 402a, and second element groups L2 each having a plurality of second antenna elements 402b.

The first antenna elements 402a in the first element group L1 extend in a first direction inclined by approximately 45° with respect to the y-axis direction, in the yz plane on the reflective surface 101a.

On the other hand, the second antenna elements 402b in the second element group L2 are inclined in a direction (second direction) approximately orthogonal to the above first direction inclined in the yz plane.

Further, a plurality of the first element groups L1 are arranged on the reflective surface 101a at intervals in a second direction, and a plurality of the second element groups L2 are arranged at intervals in a first direction.

The plurality of first antenna elements 402a and the plurality of second antenna elements 402b are arranged in a square lattice pattern having the same lattice constant. That is to say, when viewed from the normal direction (z direction) of the reflective surface 101a, the dimensions between the adjacent first antenna elements 402a are all substantially equal. Similarly, the dimensions between the adjacent second antenna elements 402b are all substantially equal.

Each of the first antenna elements 402a is disposed between a pair of second antenna elements 402b adjacent to each other in the second direction. Further, the configuration is such that when viewed from the normal direction of the reflector plate 101 (reflective surface 101a), the line connecting the pair of adjacent second antenna elements 402b passes through the center of the first antenna element 402a in the first direction. Here, since the second antenna elements 402b are also arranged in a square lattice pattern as described above, the line connecting the pair of adjacent first antenna elements 402a also passes through the center of the second antenna element 402b in the first direction. Note that the "center" mentioned above does not necessarily need to be exact, and it is sufficient that it passes through the region that divides the first antenna element 402a or the second antenna element 402b substantially equally.

Since the first element groups L1 and the second element groups L2 are arranged in directions orthogonal to each other as described above, this gives a state where the respective polarized waves are also orthogonal to each other. Furthermore, the plurality of first element groups L1 and second element groups L2 are separately controlled by a communication circuit 107 (not shown in the figure). That is to say, wireless signals of different phases and powers are fed to the first element group L1 and the second element group L2, respectively. As a result, the first element groups L1 and the second element groups L2 form mutually independent array antennas. That is to say, these array antennas operate as polarization shared array antennas capable of forming different beams for each polarized wave.

Furthermore, by arranging the first element groups L1 and the second element groups L2 in the manner described above, it is possible to reduce the possibility of regions with high levels of intensities overlapping with each other, among the electric field and the magnetic field formed by signal radiation from the first antenna elements 402a and the second antenna elements 402b.

This makes it possible to arrange the first antenna elements 402a and the second antenna elements 402b close to each other while preventing electromagnetic coupling therebetween.

In addition, according to the configuration described above, the gaps formed by the first antenna elements 402a and the second antenna elements 402b meander in a zigzag shape along the y-axis.

As a result, air flowing by natural convection in the ventilation flow path sufficiently comes in contact with the first antenna elements 402a and the second antenna elements 402b, so that the heat dissipation performance of the wireless communication device 400 is further improved.

Fifth Exemplary Embodiment

FIG. 20 to FIG. 23 are perspective schematic diagrams of a wireless communication device 400' according to a fifth exemplary embodiment of the present invention.

The wireless communication device 400' according to the fifth exemplary embodiment differs in configuration from the wireless communication device 400 shown in the fourth exemplary embodiment in that opening parts 403 are formed in the heat dissipation fins 108 arranged along the y-axis direction.

Figure 20:
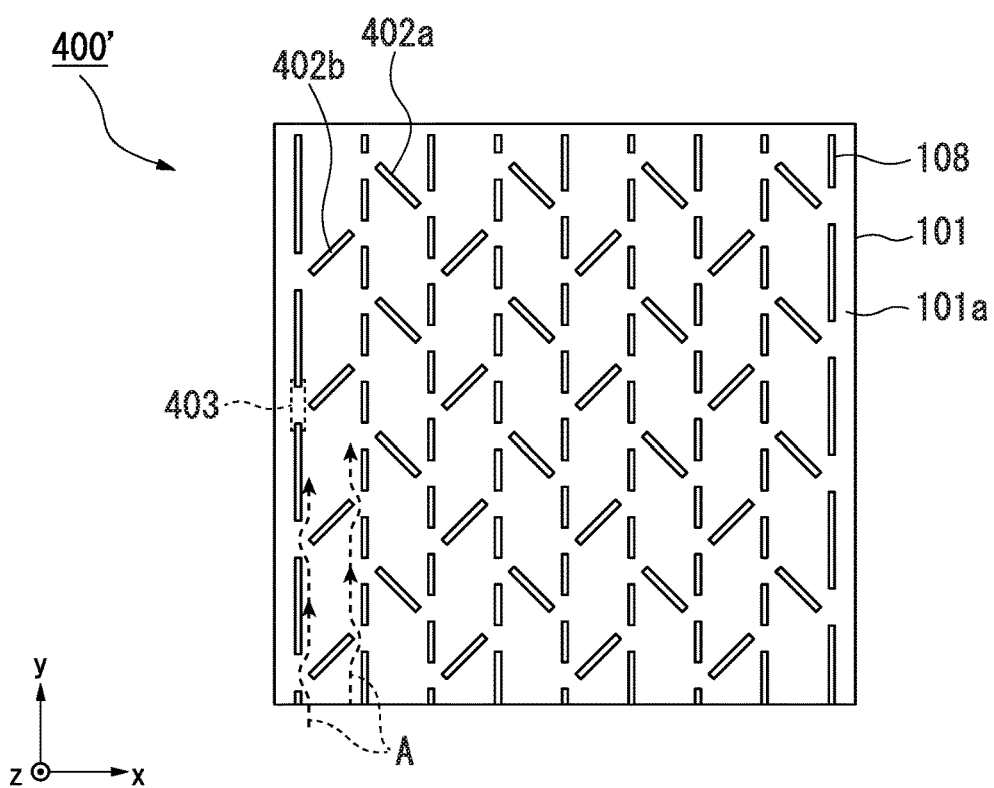
FIG. 20 is a plan schematic diagram showing a wireless communication device according to a fifth exemplary embodiment of the present invention.

The opening part 403 of the heat dissipation fin 108 shown in FIG. 20 is formed in a portion where end parts of the first antenna element 402a and the second antenna element 402b are in the vicinity of the heat dissipation fin 108. The opening part 403 may be a notch that divides the heat dissipation fin 108, or may be a hole formed only in a part of the heat dissipation fin 108. By having the opening part 403 in the heat dissipation fin 108, an air flow path A formed by the heat dissipation fin 108 and the first antenna element 402a or the second antenna element 402b is ensured. As a result, the opening part 403 prevents air from stagnating, and the heat dissipation performance of the wireless communication device is improved.

Figure 21:
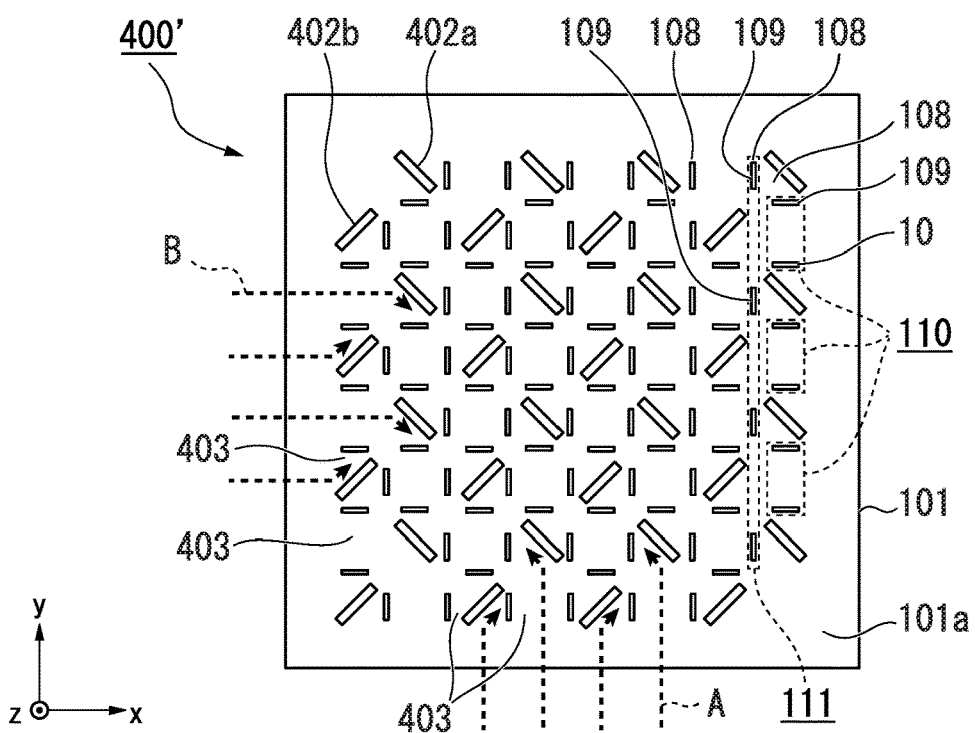
FIG. 21 is a diagram showing another modified example of the wireless communication device according to the fifth exemplary embodiment of the present invention.

Furthermore, rather than being limited to FIG. 20, as shown in FIG. 21, for example, there may be added a structure having guide pieces 109 that are parallel to the x-axis direction, with respect to the heat dissipation fins 108 that are parallel to the y-axis direction.

Specifically, although the heat dissipation fin 108 in FIG. 20 is provided in a linear shape along in the y-axis direction, the present invention is not limited to this, and as shown in FIG. 21, the heat dissipation fin 108 may be configured with a plurality of guide pieces 109, and each guide piece 109 may be arranged along the x-axis direction and along the y-axis direction as a whole.

At this time, the heat dissipation fins 108 in FIG. 21 are not limited to having all of the guide pieces 109 arranged along the x-axis direction, and some of the guide pieces 109 may be arranged in the y-axis direction to serve as a first fin row 110, while the remaining fins 109 may be arranged along the y-axis direction to serve as a second fin row 111. Furthermore, these first fin rows 110 and second fin rows 111 may be arranged alternately in the x-axis direction, which is the horizontal direction, or they may be arranged in an irregular manner so as not to alternate.

Moreover, in the heat dissipation fins 108 in FIG. 21, the guide pieces 109 of the first fin row 110 are arranged along the x-axis direction orthogonal to the y-axis direction. However, it is not limited to this, and these guide pieces 109 may be arranged diagonally so as to intersect with the y-axis direction.

By configuring the heat dissipation fins 108 composed of the first fin rows 110 and the second fin rows 111 in this manner, the ascending airflow A flowing in the perpendicular direction (y-axis direction) and the outdoor wind B blowing in the horizontal direction (x-axis direction) can both be taken into the antenna region and discharged from the antenna region without obstructing the flows, thereby enabling the heat dissipation performance to be improved.

In particular, as shown in FIG. 21, by arranging the first antenna elements 402a and the second antenna elements 402b with which the airflow introduced into the antenna region collides first, and the heat dissipation fins 108, diagonally so as not to be orthogonal to the airflow, it is possible to avoid a decrease in the speed of the airflow, which is preferable from the viewpoint of improving the heat dissipation performance.

Figure 22:
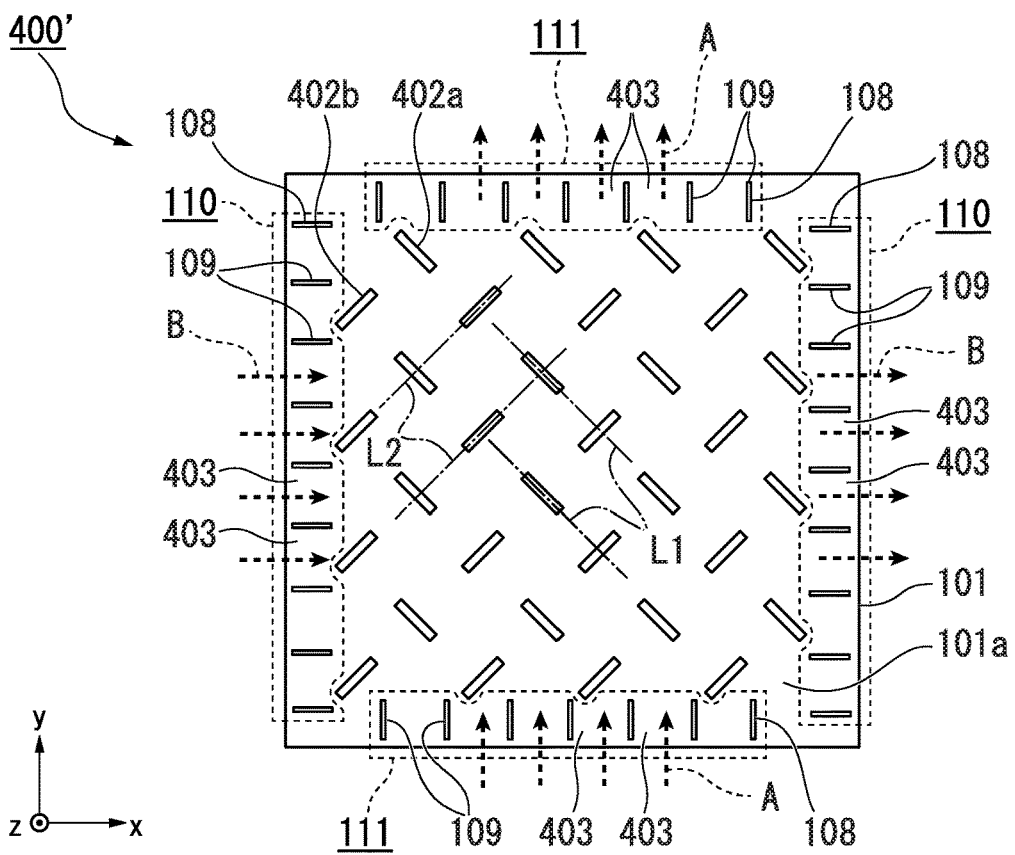
FIG. 22 is a diagram showing another modified example of the wireless communication device according to the fifth exemplary embodiment of the present invention.

Further, the present invention is not limited to the configuration of FIG. 21, and as shown in FIG. 22, the configuration may be such that the heat dissipation fins 108 are arranged in a radial manner at the periphery of the reflector plate 101, so as to surround the antenna region where the first element groups L1 and the second element groups L2 are arranged.

That is to say, as shown in FIG. 22, the guide pieces 109 of the heat dissipation fins 108 positioned on the side part of the reflector plate 101 are parallel to the x-axis direction on both the positive direction side and the negative direction side, and as a whole, they are provided in an arrangement so as to be the first fin row 110 along the y-axis direction. Moreover, the guide pieces 109 of the heat dissipation fins 108 positioned on the upper part and lower part of the reflector plate 101 are provided so as to be parallel to the y-axis direction on both the positive direction side and the negative direction side, and as a whole, they are provided in an arrangement so as to be the second fin row 111 along the x-axis direction.

By configuring the heat dissipation fins 108 composed of the first fin rows 110 and the second fin rows 111 in this manner, the ascending airflow A and the outdoor wind B can both be taken into the antenna region and discharged from the antenna region without obstructing the flows, thereby enabling the heat dissipation performance to be improved.

Moreover, the present invention is not limited to the configurations shown in FIG. 21 and FIG. 22, and the configuration may be one using a combination of the arrangement of the heat dissipation fins 108 shown in FIG. 21 and FIG. 22. For example, the configuration may be one where the guide pieces 109 of the heat dissipation fin 108 are partially omitted while confirming the heat dissipation efficiency around or inside the antenna region.

Figure 23:
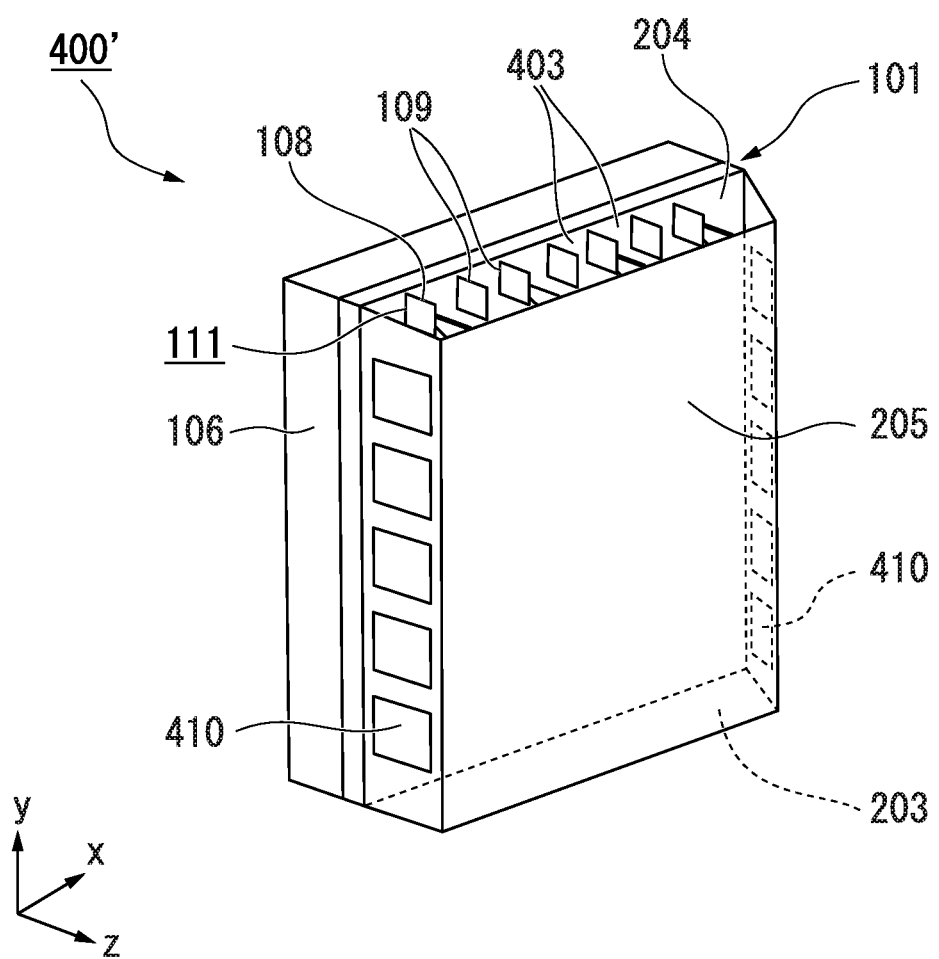
FIG. 23 is a diagram showing another modified example of the wireless communication device according to the fifth exemplary embodiment of the present invention.

Further, as shown in FIG. 23, a radome 205 may be added to the configuration of FIG. 21 and FIG. 22. In this case, as shown in FIG. 23, it is preferable that openings 410 are provided in the side part, in addition to the air inlet 203 and the air outlet 204 in the vertical direction of the radome 205. In this manner, it is possible to capture the wind blowing in the x-axis direction which is the horizontal direction, while providing the radome 205.

In FIG. 23, the case where a plurality of openings 410 are provided in a part of the side part of the radome 205 is shown as an example. However, the opening 410 may be formed by removing a major portion of the side part, or another configuration may be employed.

In any of the configurations shown in FIG. 18 to FIG. 23, the electromagnetic waves radiated from the antenna element 402 are incident on the heat dissipation fin 108. However, since the heat dissipation fin 108 has the frequency selective surface 108A as with the wireless communication device 100 of the first exemplary embodiment, electromagnetic waves of a specific band can be transmitted. That is to say, the wireless communication devices 400 and 400' according to the fourth and fifth exemplary embodiments can dissipate heat without the heat dissipation fins 108 obstructing wireless communication.

Also in the present exemplary embodiment, the wireless communication device 400 can use the radome 205, the fan 211, the eave 221, and the heat radiator 231 (heat sink), respectively, as described above. For each antenna element 402, one that is similar to that of the antenna element 302 in the third exemplary embodiment can be used. Also among the antenna elements 302 described in the third exemplary embodiment, use of a compact antenna that uses the split ring resonator shown in FIG. 15 to FIG. 17 enables a configuration that does not obstruct the flow of air in the ventilation flow path.

As described above, according to the wireless communication device according to the fourth and fifth exemplary embodiments, it is possible to perform heat dissipation without obstructing electromagnetic waves radiated from the antenna element. Also, since there are provided antennas that extend obliquely in two directions, it is possible to form different beams for each polarized wave.

Sixth Exemplary Embodiment

Figure 24:
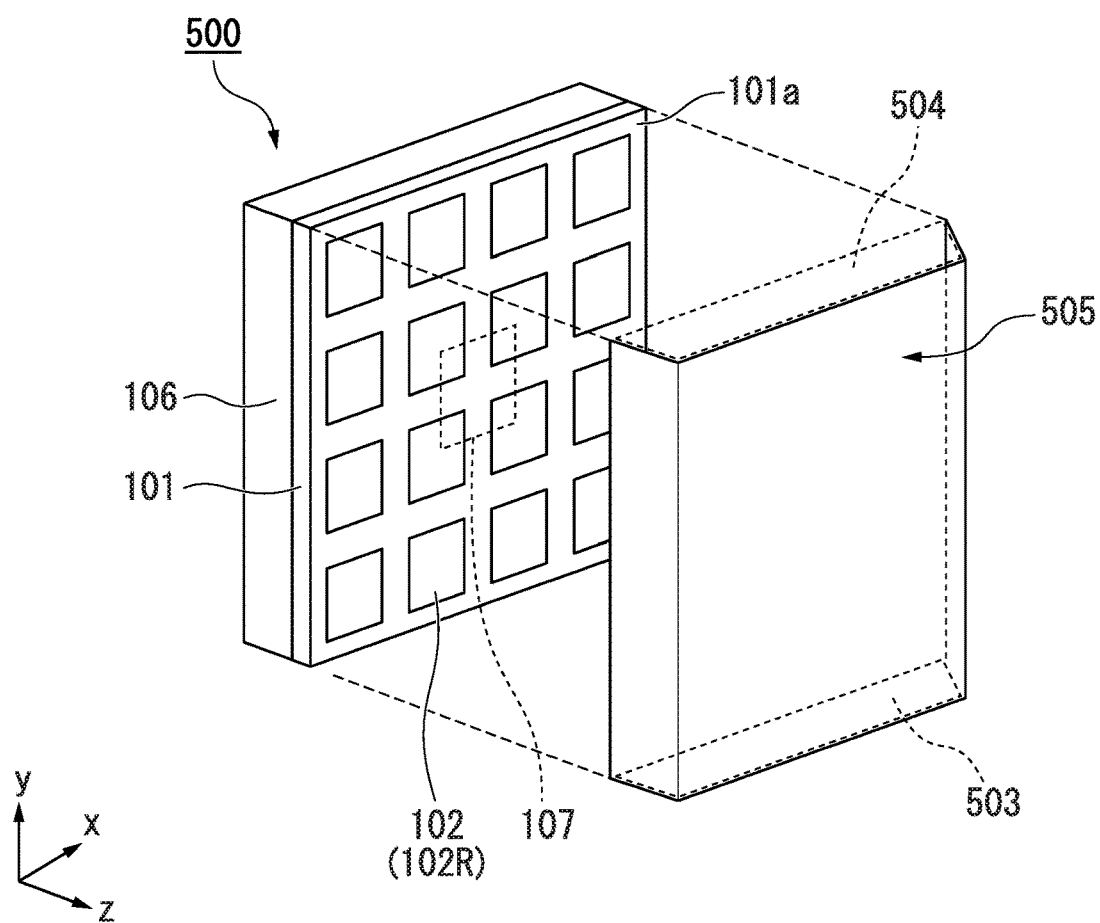
FIG. 24 is a perspective schematic diagram showing a wireless communication device according to a sixth exemplary embodiment of the present invention.

FIG. 24 is a perspective schematic diagram of a wireless communication device 500 according to a sixth exemplary embodiment of the present invention. The wireless communication device 500 according to the sixth exemplary embodiment is different from the wireless communication device 100 according to the first exemplary embodiment in that it has no heat dissipation fin 108, and a predetermined radome 505 is provided. That is to say, there are included: a reflector plate 101 having a reflective surface 101a that reflects electromagnetic waves; an array antenna 102R having a plurality of antenna elements 102 arranged at intervals on the reflective surface 101a; a radome 505 that forms, with the reflective surface 101a, a ventilation flow path therebetween; and a communication circuit 107 that excites the array antenna 102R and transmits and/or receives wireless signals via the array antenna 102R. The same components as those of the wireless communication device 100 according to the first exemplary embodiment are denoted by the same reference symbols, and a detailed description thereof will be omitted.

In the wireless communication device 500 shown in FIG. 24, the radome 505 has a configuration similar to that of the radome 205 in the second exemplary embodiment. Therefore a detailed description thereof will be omitted. The radome 505 has a frequency selective surface having conductive parts arranged regularly thereon. The shape of the frequency selective surface can be the same shape as that of the frequency selective surface provided on the heat dissipation fin 108 in the first exemplary embodiment (refer to FIG. 3A to FIG. 3E).

Since the wireless communication device 500 has the radome 505, natural convection of air directed from the perpendicularly lower side to the perpendicularly upper side is promoted, and the wireless communication device 500 can efficiently dissipate heat. Also, since the radome 505 has the frequency selective surface, the wireless communication device 500 can dissipate heat without hindering the wireless communication of the antenna array 102R.

When a part of the frequency selective surface of the radome 505 is in contact with the reflector plate 101, the heat dissipation efficiency of the wireless communication device 500 is further improved. The reason for this is that the conductive parts constituting the frequency selective surface receive the heat transmitted from the reflector plate 101. Therefore the wireless communication device 500 dissipates more heat. With a larger area occupied by the frequency selective surface in the radome 505, the heat dissipation effect of the wireless communication device 500 is improved.

Figure 25:
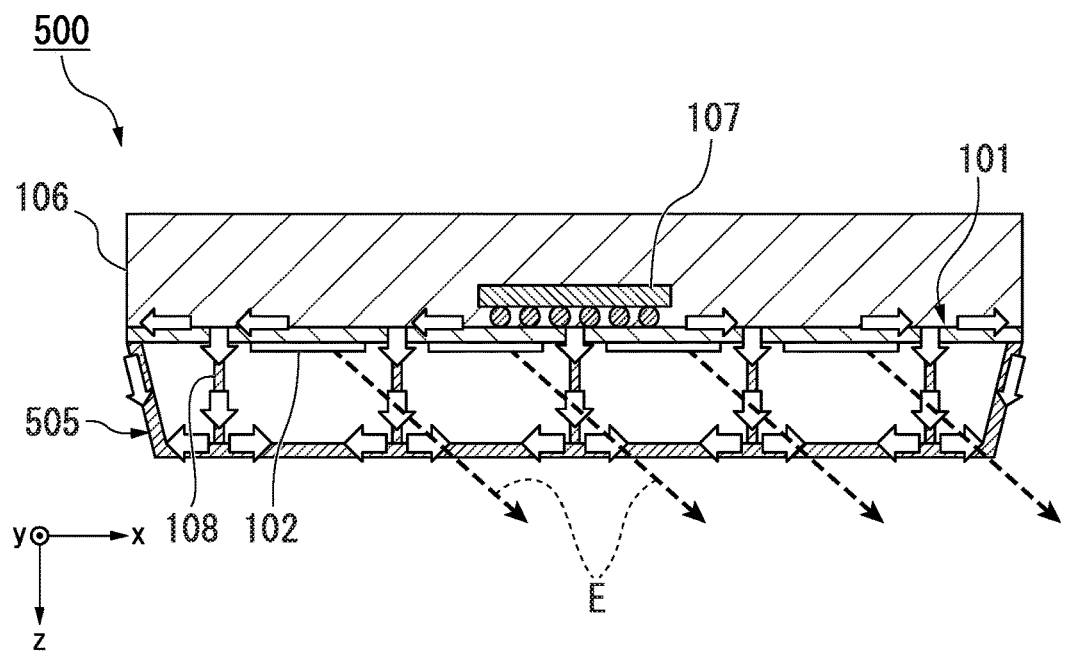
FIG. 25 is a cross-sectional schematic diagram of a modified example of the wireless communication device according to the sixth exemplary embodiment of the present invention.

Further, in the present exemplary embodiment, as shown in FIG. 25, the wireless communication device 500 may be provided with radiating fins 108 each connected to the reflective surface 101a of the reflector plate 101 and to the radome 505.

By providing the heat dissipation fins 108, the area where heat generated in the wireless communication device 500 comes in contact with air is increased, and heat dissipation efficiency of the wireless communication device 500 is improved. Further, since a path for transferring heat to the radome 505 via the heat dissipation fin 108 is formed, heat dissipation efficiency of the wireless communication device 500 is further improved. For the antenna element 108, one that is similar to that in the first exemplary embodiment can be used.

In the present exemplary embodiment, the heat dissipation fins 108 connect the reflective surface 101a and the radome 505. However, the configuration may be such that the heat dissipation fins 108 are connected to only the radome 505.

Furthermore, depending on the environment in which the wireless communication device is arranged, the eave 221 may be provided above the air outlet 504. Further, the fan 211 may be provided in the air inlet 503 and/or the air outlet 504. Moreover, depending on the environment in which the wireless communication device is arranged, the heat radiator 231 may be provided on the surface of the casing part 106 on the side opposite to the reflector plate 101.

As described above, according to the wireless communication device according to the sixth exemplary embodiment, since the radome has the frequency selective surface, the wireless communication device can prevent a situation where electromagnetic waves radiated from the antenna elements are obstructed by the radome. Also, since natural convection occurs due to the radome, the wireless communication device can efficiently dissipate heat.

The present invention has been described with reference to the respective exemplary embodiments. However, the present invention is not limited to the exemplary embodiments described above. In the configurations and details of the present invention, various omissions, replacements, and changes that can be understood by those skilled in the art may be made within the scope of the present invention.

Note that the above exemplary embodiments include the invention described in the following supplementary notes.

(Supplementary Note 1)

A wireless communication device characterized in that the fins have:

a first fin row comprising a plurality of first guide pieces parallel to a first direction; and a second fin row comprising a plurality of second guide pieces parallel to a second direction that is orthogonal to the first direction.

(Supplementary Note 2)

The wireless communication device characterized in that the first fin row and the second fin row are arranged alternately on a reflective surface.

(Supplementary Note 3)

The wireless communication device characterized in that the first fin row and the second fin row are provided on the reflective surface along a perpendicular direction, and are arranged alternately along the horizontal direction.

(Supplementary Note 4)

The wireless communication device characterized in that the first fin row and the second fin row are arranged on the reflective surface along a periphery part so as to surround an antenna region.

(Supplementary Note 5)

The wireless communication device characterized in that the fins are conductors.

(Supplementary Note 6)

The wireless communication device characterized in that the fins are dielectric bodies having a high level of thermal conductivity.

(Supplementary Note 7)

The wireless communication device characterized in that the transmission and reception circuit is disposed on a surface of the reflector plate on a side opposite side to the reflective surface.

(Supplementary Note 8)

The wireless communication device characterized in that a part of a frequency selective surface of the radome is in contact with the reflector plate.

This application is based upon and claims the benefit of priority from Japanese Patent Application No. 2015-226746, filed Nov. 19, 2015, and Japanese Patent Application No. 2016-163270, filed Aug. 24, 2016, the disclosure of which is incorporated herein in its entirety by reference.

INDUSTRIAL APPLICABILITY

According to the present invention, it is possible to provide a wireless communication device capable of improving heat dissipation performance while being able to suppress an increase in size of the device.

REFERENCE SYMBOLS 100, 200, 210, 220, 230, 300, 400 Wireless communication device
101 Reflector plate
101a Reflective surface
102, 302, 402 Antenna element
102R, 302R, 402R Array antenna
106 Casing part
107 Communication circuit
108 Heat dissipation fin
108A Frequency selective surface
108a, 108c, 108d, 108f Conductor part
108b, 108e, 108f Opening part
109 Guide piece
110 First fin row
111 Second fin row
201 Top plate
202 Supporting part
203, 503 Air inlet
204, 504 Air outlet
205, 505 Radome
211 Fan
221 Eave
231 Heat radiator
303 Dielectric substrate
304a, 304b Antenna pattern
305 Feeding point
306 Annular conductor part
307 Rectangular conductor part
308 Split
309 Rectangular region
310 Conductive via
311 Conductor feeder line
315 Conductive via
402a First antenna element
402b Second antenna element
403 Opening part
L1 First element group
L2 Second element group

What is claimed is:

1. A wireless communication device comprising:
a reflector plate;
an array antenna;
a fin; and
a communication circuit, wherein
the reflector plate:
comprises a reflective surface reflecting an electromagnetic wave,
the array antenna:
comprises a plurality of antenna elements arranged on the reflective surface,
the fin:
stands on the reflective surface,
is provided between two antenna elements of the plurality of antenna elements, and
comprises a frequency selective surface, and
the communication circuit:
is electrically connected to the array antenna, and
is connected to the reflector plate, and
wherein the frequency selective surface is perpendicular to the reflective surface.

2. The wireless communication device according to claim 1, wherein a height of the plurality of antenna elements in a normal direction of the reflective surface is lower than a height of the fin in the normal direction.

3. The wireless communication device according to claim 1, wherein the fin extends in a same direction as a direction in which the plurality of antenna elements extend.

4. The wireless communication device according to claim 1, wherein the plurality of antenna elements comprise:
a plurality of first element groups, each of which extends in a first direction; and
a plurality of second element groups, each of which extends in a second direction,
wherein the first direction and the second direction are orthogonal to each other,
wherein the plurality of first element groups are provided spaced apart from each other in the second direction, and wherein the plurality of second element groups are provided spaced apart from each other in the first direction.

5. The wireless communication device according to claim 4, wherein the fin comprises an opening part in a vicinity of at least an antenna element of the plurality of first element groups or an antenna element of the plurality of second element groups.

6. The wireless communication device according to claim 1, further comprising:
a radome,
wherein the fin is connected to the radome.

7. The wireless communication device according to claim 1, wherein a transmissive frequency band of the frequency selective surface comprises a frequency of an electromagnetic wave radiated from at least one of the plurality of antenna elements.

8. The wireless communication device according to claim 1, wherein a transmissive frequency band of the frequency selective surface comprises a frequency of an electromagnetic wave radiated from the plurality of the antenna elements.

9. The wireless communication device according to claim 1, wherein the frequency selective surface comprises a frequency band in which an electromagnetic wave passes through the frequency selective surface, the frequency band of the frequency selective surface comprising a frequency of an electromagnetic wave radiated from at least one of the plurality of antenna elements.

* * * * *